United States Patent
Bloesch et al.

(10) Patent No.: US 7,979,842 B2
(45) Date of Patent: *Jul. 12, 2011

(54) EXTENSIBILITY APPLICATION PROGRAMMING INTERFACE AND FRAMEWORK FOR META-MODEL OBJECTS

(75) Inventors: Anthony Bloesch, Vashon, WA (US); Ramesh Rajagopal, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 893 days.

This patent is subject to a terminal disclaimer.

(21) Appl. No.: 11/935,140

(22) Filed: Nov. 5, 2007

(65) Prior Publication Data
US 2008/0163160 A1    Jul. 3, 2008

Related U.S. Application Data

(63) Continuation of application No. 10/666,977, filed on Sep. 18, 2003, now Pat. No. 7,293,254.

(51) Int. Cl.
*G06F 9/44* (2006.01)
(52) U.S. Cl. .................. 717/108; 717/112; 717/116
(58) Field of Classification Search .................. None
See application file for complete search history.

(56) References Cited

U.S. PATENT DOCUMENTS

| | | | |
|---|---|---|---|
| 5,872,973 A | 2/1999 | Mitchell et al. | |
| 6,085,198 A | 7/2000 | Skinner et al. | |
| 6,158,044 A | 12/2000 | Tibbetts | |
| 6,301,585 B1 | 10/2001 | Milne | |
| 6,381,735 B1 | 4/2002 | Hunt | |
| 6,385,724 B1 | 5/2002 | Beckman et al. | |
| 6,425,017 B1 | 7/2002 | Dievendorff et al. | |
| 6,442,620 B1 | 8/2002 | Thatte et al. | |
| 6,487,665 B1 | 11/2002 | Andrews et al. | |
| 6,513,152 B1 | 1/2003 | Branson et al. | |
| 6,574,736 B1 | 6/2003 | Andrews | |
| 6,587,849 B1 | 7/2003 | Mason et al. | |
| 6,604,198 B1 | 8/2003 | Beckman et al. | |
| 6,606,711 B2 | 8/2003 | Andrews et al. | |
| 6,704,803 B2 | 3/2004 | Wilson et al. | |
| 6,704,804 B1 | 3/2004 | Wilson et al. | |
| 6,714,962 B1 | 3/2004 | Helland et al. | |
| 6,748,455 B1 | 6/2004 | Hinson et al. | |
| 6,748,555 B1 | 6/2004 | Teegan et al. | |
| 6,754,643 B1 | 6/2004 | Goldsmith | |
| 6,757,899 B2 | 6/2004 | Zhdankin et al. | |

(Continued)

OTHER PUBLICATIONS

Constantinos A. Constantinides, et al., Designing an Aspect-Oriented Framework in an Object-Oriented Environment, ACM Computing Surveys, vol. 32 Issue 1es, 2000, 12 pages.

(Continued)

*Primary Examiner* — James D Rutten
(74) *Attorney, Agent, or Firm* — Workman Nydegger

(57) ABSTRACT

The present invention relates to a system and methodology providing an Application Programming Interface (API) and framework that supports a meta-object model for application design and operating system interactions. The API includes an input component that receives data and/or instructions. The input component processes a meta-data model that interrelates data via a class hierarchy, wherein the class hierarchy includes relationship descriptions between class objects, attributes, rules, and/or behavioral descriptions. Another aspect includes a data management system that includes a component to receive an item having meta-data annotations. An analysis component determines at runtime a structure for the item via deployment of the meta-data annotations. The system can also include a framework component that defines meta-data class derivations, meta-data classes, meta-data integrity rules, and/or meta-data class behavior.

10 Claims, 13 Drawing Sheets

U.S. PATENT DOCUMENTS

| | | | |
|---|---|---|---|
| 6,829,770 | B1 | 12/2004 | Hinson et al. |
| 6,880,086 | B2 | 4/2005 | Kidder et al. |
| 6,889,227 | B1 | 5/2005 | Hamilton |
| 6,912,710 | B2 | 6/2005 | Broussard et al. |
| 6,973,655 | B2 | 12/2005 | Jacquin et al. |
| 7,093,200 | B2 | 8/2006 | Schreiber et al. |
| 7,130,885 | B2 | 10/2006 | Chandra et al. |
| 7,293,254 | B2 | 11/2007 | Bloesch |

OTHER PUBLICATIONS

Pascal Rapicault, Model and Techniques to specify, develop, and use a framework: a meta modeling approach, Conference on Object Oriented Programming Systems Languages and Applications, 2000, pp. 151-152.

Mike P. Papazoglou et al., A Semantic Meta-modelling Approach to Schema Transformation, Conference on Information and Knowledge Management, 1995, pp. 113-121.

Externalization Service Specification, version 1.0, Apr. 2000, Object Management Group (OMG). Whole manual.

Template Software, SNAP Library Module Reference, version 8.0 1996, pp. 3-763 to 3-773.

Lonnie E Moseley, et al. Mastering Microsoft Office '97 Professional Edition, Second Edition, 1997, p. 829.

Hans Vangheluwe, et al. Meta-Models Are Models Too. Proc. of 2002 Winter Simulation Conf., pp. 597-605.

Using the SNAP Development Environment, version 8, Template Software, Whole manual, released 1997.

Greg Perry. Teaching Yourself Visual Basic 6 in 21 Days, SAMES, p. 64-65, 1998.

Gregory Kiczales, et al. Aspect—Oriented Programming, Xerox Parc, Jun. 1997, 23 pages.

John Viega, et al. Can Aspect-Oriented Programming Lead to More Reliable Software. IEEE 2000, pp. 19-21.

P. Netinant, et al. Aspect-Oriented Frameworks: the Design of Adaptable Operating Systems, ACM 2000, pp. 61-62.

Erik Hilsdale, et al. AspectJ: the Language and Support Tools. Xerox Parc, p. 163, ACM.

Markus Voelter. Aspect-Oriented Programming in Java, Nov. 28, 2001, 7 pages.

Constantinos A. Constantinides, et al. Designing an Aspect—Oriented Framework in an Object-Oriented Environment. ACM 2000, pp. 1-12.

Robert J. Walker, et al. An Initial Assessment of Aspect-Oriented Programming. ACM 1999, pp. 120-130.

Larry O'Brien. The First Aspect-Oriented Compiler. Xerox PARC, Sep. 2001, 5 pages.

Rich Price. AspectJ 0.8b5: Real World of AOP Tool Simples Oo Development. JAVA Report, Nov. 2001, 5 pages.

Early Definition of Aspect-Oriented Programming, www.ccs.neu.edu, Nov. 2001, 3 pages.

Thoughts on Aspect-Oriented Programming, Nov. 2001, 3 pages.

Aspect-Oriented Programming, ACM, Oct. 2001, pp. 28-41, 43-57, 59-65, 67-73, 75-77, 79-85, 87-93, 95-97.

"Workflow Template Process Template—Developing a WFT Workflow System", Template Software 1998, whole book.

Workflow Template Process Template—Using the WFT Development Environment. Template Software 1998, whole book.

Office Action dated Jul. 6, 2006 cited in U.S. Appl. No. 11/666,977.

Office Action dated Dec. 15, 2006 cited in U.S. Appl. No. 11/666,977.

Office Action dated Mar. 27, 2007 cited in U.S. Appl. No. 11/666,977.

Notice of Allowance dated Sep. 11, 2007 cited in U.S. Appl. No. 11/666,977.

US 7,979,842 B2

EXTENSIBILITY APPLICATION PROGRAMMING INTERFACE AND FRAMEWORK FOR META-MODEL OBJECTS

RELATED APPLICATION

This application is a Continuation of U.S. patent application Ser. No. 10/666,977, filed on Sep. 18, 2003, entitled EXTENSIBILITY APPLICATION PROGRAMMING INTERFACE AND FRAMEWORK FOR META-MODEL, the entire contents of which are herein incorporated by reference.

TECHNICAL FIELD

The present invention relates generally to computer systems, and more particularly to a system and method that facilitates application development via a meta-model object and framework supporting meta-classes, meta-attributes, meta-relationships, rules and behavior.

BACKGROUND OF THE INVENTION

Modern operating systems are required to support many diverse applications having complex interrelationships with the system. Such applications include word processors, spreadsheets, development tools, communications applications, graphical applications, and processing applications to name but a few examples. One innovation for implementing such applications has been through employment of object oriented programming techniques. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts. For example, an "object-oriented" computer scientist would be mostly concerned with an application under design, and secondarily with the tools used to develop it—whereas a "non-object-oriented" scientist would think primarily of his or her tools.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., image data) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

Although object-oriented programming techniques are still widely employed, newer systems and applications have evolved. One such system includes a managed object system whereby the operating system itself is involved in the determination and management of the lifetime of an object (e.g., automatically reclaiming an object from system memory via a garbage collector versus internal reference counting on the object). These systems also support different types of data such as meta-data, for example, that provide data and corresponding descriptions for such data. When newer applications are developed for these type data structures and systems however, object-oriented models are at a minimum are problematic. For example, such models may require application designers to maintain and manage operating system states and events in order to successfully implement an application. Thus, with traditional approaches, even simple changes to an application document or item can require very complex code to maintain internal document structure and to support corresponding changes.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that facilitate application development by providing an Application Programming Interface (API) and framework supporting meta-data manipulations and interactions. A meta-model object is provided that supports a higher-level abstraction for data classes operating in context of meta-data than is provided by conventional object models. This abstraction includes a description for the types of classes that may be involved during application development, deployment, and execution. These descriptions also enable developers to describe attributes, relationships, and respective constraints for meta-data that simplifies program development and operating system interactions.

In one aspect, the API is provided as an extensibility framework that reduces the effort required to build and maintain applications (e.g., software modeling tools). Users of the API can create assemblies that contain annotated classes that derive from classes defined by the associated framework. The framework reads meta-data from respective component assemblies to determine at runtime the structure of an item such as a document, for example. Thus, users of the API may extend the structure of a base item or document with new meta-classes, meta-attributes, meta-relationships, integrity rules, and behavior, for example. Also, the API supports base-level functionality such as undo/redo, transactions, and light-weight events, thereby relieving developers from coding and managing such tasks.

As noted above, the present invention defines and supports meta-model objects to facilitate efficient application development and mitigate complexities associated with operating system interactions. Such models can include meta-classes that are abstract entities that make up an item (e.g., relational table). These classes correspond in general to classes in an object model. Thus, meta-classes may inherit from other meta-classes. Other aspects of the model include meta-attributes that are values associated with the meta-class (e.g., the name of a table) and generally correspond to the fields of a class. Meta-relationships, which are also part of the model, include descriptions of relationships that may exist between various model classes (e.g., associating a relational table column with a bounded default for the column).

Another aspect of the present invention in conjunction with the API is to provide a set of basic services that are required to implement software design tools and editors for items such as documents having complex structure. Such items can be managed within components such as stores and sub-stores. These basic services support for example:

Storing and managing document data
Extending the store's schema (meta-model) at runtime
Traversing and querying the store's schema
Modifying the store's document data in a reversible way through nested transactions
Light-weight subscription to document change events
Declarative and imperative rules to maintain document consistency and respond to document changes The API enables developers to manipulate complex documents in a straightforward and natural manner. In contrast with traditional approaches, even simple changes to a document can require very complex code to maintain internal document structure and suitably handle undo/redo functionality, for example. A typical use of the API is to create a set of interrelated classes that inherit from base classes in a core meta-model. These classes are then able to leverage the base classes for services such as state management. Typically, class implementers wrap calls to a lower level API with properties and events that call lower level APIs. Thus, a broad range of high quality design tools for developers can be supported. The extensibility API significantly reduces the cost of development and increases the quality of design tools that are constructed therewith.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology providing an Application Programming Interface (API) and framework that supports a meta-model object for application design and operating system interactions. In one aspect of the present invention, an API is provided having an input component that receives data and/or instructions. The input component processes a meta-data model that interrelates data via a class hierarchy, wherein the class hierarchy includes relationship descriptions between class objects, attributes, rules, and/or behavioral descriptions. Another aspect includes a data management system or engine that includes a component to receive an item having meta-data annotations. An analysis component determines at runtime a structure for the item via deployment of the meta-data annotations. The system can also include a framework component that defines meta-data class derivations, meta-data classes, meta-data integrity rules, and/or meta-data class behavior.

As used in this application, the terms "component," "framework," "assembly," "application," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
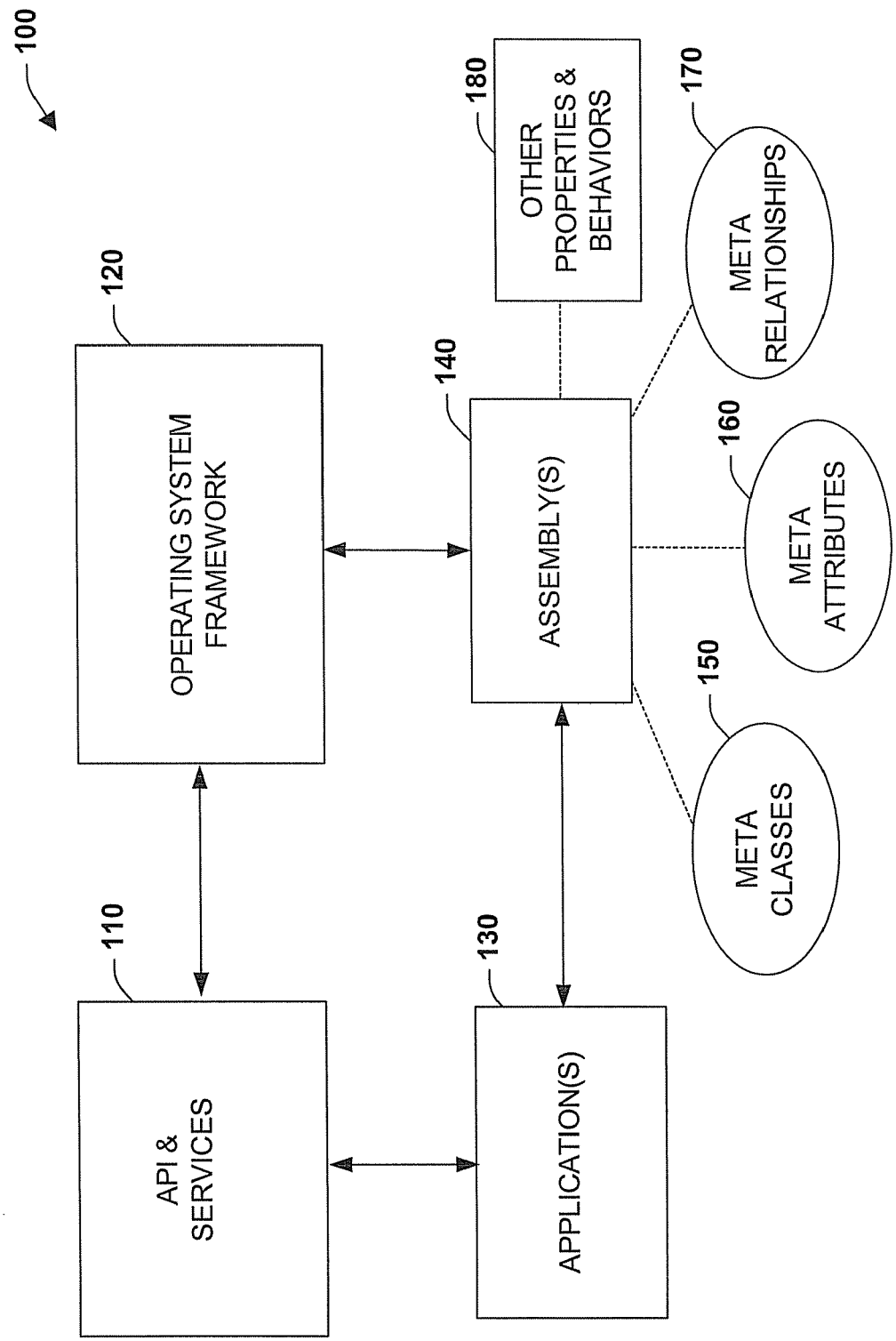
FIG. 1 is a schematic block diagram of an application programming interface and framework for processing meta-model objects in accordance with an aspect of the present invention.

Referring initially to FIG. 1, a system 100 illustrates an application programming interface and framework for processing meta-model objects in accordance with an aspect of the present invention. The system 100 includes an Application Programming Interface (API) 110 and associated services that operate in conjunction with an operating system framework 120. The API 110 enables one or more applications 130 to utilize base functionality of the operating system framework 120 while mitigating management and design of complex code to interact with the system. For example, applications 130 often need to be aware of system level states and events that may impact operation of the applications. The API 110 relieves the applications 130 from processing such states and events by providing functionality, services, and interfaces that can be called by the applications in lieu of designing and managing code for such services. In one specific example, applications 130 often need to undo and/or redo a previous action such as when a user attempts to undo a graphics or text action in a document (e.g., undo is often implemented as a control-z action in the application). The API 110 enables the application 130 to call basic interfaces that support/process such actions without causing any given application to replicate and manage code. As can be appreciated, a plurality of such functionality can be provided by the API 110 as will be described in more detail below.

In general, the API provides an extension to the framework 120 that reduces the effort required to build and maintain applications 130 such as software modeling tools, editor tools, design tools, graphics tools, word processors, and so forth. Users of the API 110 can create one or more assemblies 140 that contain annotated classes that derive from classes defined by the associated framework 120. The framework 120 reads meta-data from respective component assemblies 140 to determine at runtime the structure of an item such as a document, for example. Consequently, users of the API 110 may extend the structure of a base item or document with new meta-classes, meta-attributes, meta-relationships, integrity rules, and behavior, for example. Also, the API 110 supports base-level functionality such as undo/redo operations, basic file operations, other transactions, and lightweight events, thereby relieving developers from coding and managing such tasks.

The system 100 defines and supports meta-model objects to facilitate efficient application development and mitigate complexities associated with operating system interactions. Such models can include meta-classes 150 that are abstract entities that make up an item such as a relational table or other item component. These classes correspond in general to classes in an object model. Thus, meta-classes 150 may inherit from other meta-classes and/or from base functionality provided by the framework 120. Other aspects of the model include meta-attributes 160 that are values associated with the meta-class 150 (e.g., the name of a table) and generally correspond to the fields of a class. Meta-relationships 170, which are also part of the model, include descriptions of relationships that may exist between various model classes and are described in more detail below with other properties and behaviors illustrated at 180.

Before proceeding, it is noted that the following discussion includes example code implementations. These implementations may employ such example coding aspects as utilizing C# code or SQL statements. It is to be appreciated however, that the meta-model objects, framework, and associated API functionality can be applied to substantially any type of code mechanism (e.g., X#, Pearl, Ruby, Python, other dynamic languages, and so forth), component, and/or system that is operative with meta-data and/or managed operating systems.

The following discussion describes various aspects of meta-model objects in accordance with the present invention. Meta-data is data describing the structure of classes and relationships between the classes. Meta-data can be logically decomposed into several types of meta-data including meta-models (information about models, such as a Relational Model or a Process Model), meta-classes (information about classes), and meta-relationships (relationships between meta-classes). While each type of meta-data generally has specialized information content, some information content is shared between meta-data classes. Typically, all classes storing model meta-data need to be uniquely identified. Globally Unique Identifiers (GUIDs) are guaranteed to be globally unique, so they are a good choice for a unique identifier.

GUIDs are often difficult for humans to remember, associate with a particular idea, or even type without error. Because of this, the system 100 can attach non-unique (not-guaranteed-unique) textual labels to meta-data classes. These labels are sometimes referred to as "Names." Meta-data classes' identities can be exposed in a user interface (UI), especially in property pages, as the class of the model elements. Names are generally not appropriate here because they tend to be developer-centric and they are not localized. In lieu of the Name property, a localized friendly tag can be employed which is called a "Caption."

A meta-model is type of meta-data describing a model's structure. Examples of models include a UML model and an SQL Server Schema model. The model's structure is composed of the meta-classes and meta-relationships of the model. Each meta-model can be associated with a partition of a database (e.g., SQL server database), which is called a schema.

The meta-class 150 is a class encapsulating data employed to represent another class. For example, the meta-class for a relational database table class may have operations to describe the type of the table class, the column structure of the table, and so forth. The classes that meta-classes 150 describe may have inheritance relationships with other classes. Attributes of the meta-class 150 are contained in an ordered set of meta-attributes. As noted above, meta-classes 150 may have relationships with other meta-classes. For example, relational tables have a relationship with relational table columns, which may be named "TableColumn," for example.

The meta-attributes 160 are the attributes of the meta-class 150. For example, the meta-attributes for a relational table column might include data-type, length, and default value, for example. Meta-classes 150 can be represented as a table in a Working Store (described below) and the meta-attributes 160 associated with the meta-class are represented as the columns of that table. Meta-relationships 170 include various types of relationships between various model classes. For example, relational tables contain relational table columns, and relational table columns may be associated with a bound default. The descriptions of these relationships are contained in meta-relationships 170. One example way to capture relationship data in a database is to use a join table, which allows various cardinality combinations to be modeled uniformly. The meta-classes that are participating in the relationship are said to play a role in the relationship. The information about these roles is called a meta-role. Each meta-relationship typically contains an ordered set of meta-roles.

Meta-roles are data about the participation of meta-classes 150 in a meta-relationship. Meta-roles have a reference to the meta-class playing the role. This is used to determine which meta-class instances can be allowed to participate in a particular meta-relationship instance. Meta-roles may be optional in a relationship. This information is used when validating a meta-class instance—a meta-class instance is generally invalid if it is required to participate in a relationship with another meta-class instance, but no such instance is defined. Meta-class instances may be logically composed of other meta-class instances. For example, relational table instances may contain (be composed of) its columns. Meta-roles have an associated cardinality, which is the maximum number of meta-class instances that may play the role in a given meta-relationship instance. This cardinality may be "one" or "many." This information is used to determine whether a single meta-relationship instance reference or an array of meta-relationship instances is to store relationship instance data for a particular meta-class instance.

Figure 2:
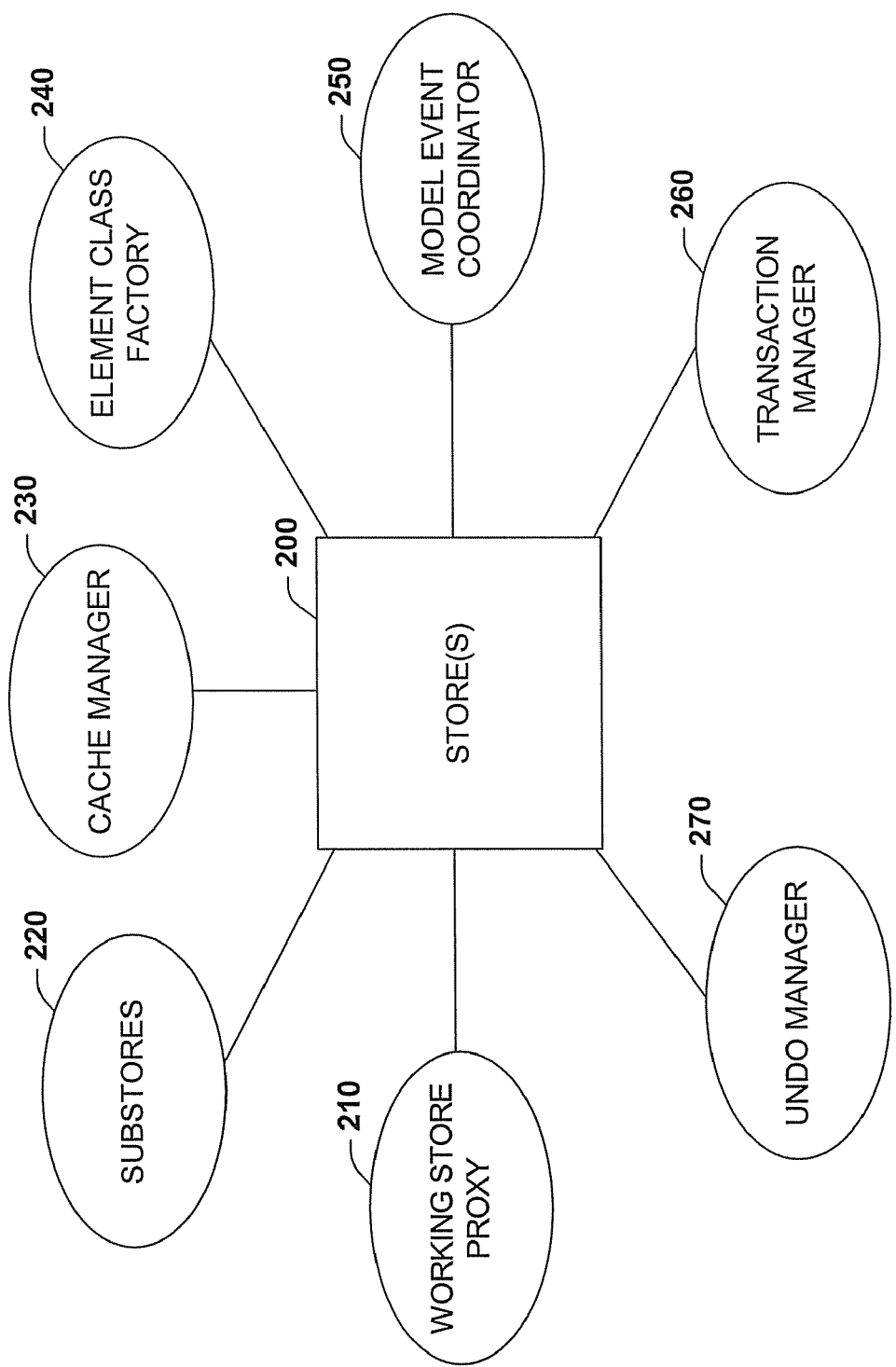
FIG. 2 is a diagram of a model store in accordance with an aspect of the present invention.

Referring now to FIG. 2, a model store 200 (also referred to as store) is illustrated in accordance with an aspect of the present invention. Model data is typically stored in a directed acyclic graph (DAG) structure. This allows for the existence of a well-known root from which model data may be located by traversing the DAG. The top-level nodes in this DAG are called Stores 200. Stores contain data and meta-data for a particular application (e.g., Visual Studio Solution). More than one Store 200 may exist in the application at a time. Store objects are contained in a static array of Stores contained by the Store class. This allows the Store class to act as the "well-known root" of the model data DAG. Associated with the Store 200 is optionally a database catalog, which can be unambiguously specified by indicating a server, catalog pair.

Generally, Stores 200 can contain the following objects:
(1) A WorkingStoreProxy 210, which is a proxy for a database catalog containing the Working Store used to implement models.
(2) A collection of Substores 220, which are the meta-data for a particular model.
(3) A CacheManager 230 object for a Solution. A CacheManager is an object that controls which model data are cached in memory and which need to be read in from the Working Store.
(4) An ElementClassFactory 240, which is used to create new or instantiate existing elements.
(5) A ModelEventCoordinator 250 object for a Solution. A ModelEventCoordinator allows for listeners to register for event notifications for store-wide events, such as when an Element is created, or when an Attribute value is changed.
(6) A TransactionManager 260 object for a Solution. A TransactionManager provides methods to create transactions (including nested transactions) and to keep track of the transaction state of a Solution, such as transaction nesting level.
(7) An UndoManager 270 object for a Solution. An UndoManager provides component to implement Undo and Redo actions.

The following discussion describes the store 200 and associated components in more detail. Working Store Proxies 210 encapsulate a physical database that contains a Working Store. When a Working Store Proxy connects to a Working Store instance, it should check to make sure that the versions of the schema in the Working Store match current versions. If the versions in the Working Store are more recent than those known by the Proxy 210, an exception should be raised and no further interaction should be possible with the database. If the versions in the Working Store are out-of-date, the Proxy should create a new database catalog and invoke methods on the Substores 220 to migrate the model data to the new database. After the migration, the Proxy 210 will use the new database as the Working Store for the model.

Substores 220 contain meta-data for a particular meta-model. When a database is loaded that contains a model, the system or framework generally checks the version status of the model. There are at least four possible results: current, updateable, transformable, and non-transformable. A current model is a database that contains a Working Store where each schema in the database has the same version that the C# code (or other type) is designed to work with. An updateable model is a model where one or more schemas have a previous version stamp, but there are no schema changes required; the schemas can be brought up-to-date by simply changing the version stamps. A transformable model is a model that contains one or more schemas that have a previous version stamp and require a schema change to be brought up-to-date. A non-transformable model is a database that either contains a future version of a meta-model, or one that does not contain a meta-model at all.

The models described above may be much larger than the physical memory. This necessitates the use of a database management system to hold working data models. Information stored in databases is difficult to manipulate directly, thus, a scheme can be adopted where the database is hidden from the modeling classes, and load a subset of the model into memory for manipulation using code in a natural manner. The amount of model data that can be in memory at any time is generally limited to a specific size based on the size of physical memory, the size of code, the size of the system software and other factors. The Model Data Cache Manager 230 has the responsibility to determine which data needs to be in memory at any given time and loading or unloading data to match those needs.

The Element Class Factory 240 is responsible for managing the lifetimes of Elements. The Element Class Factory 240 provides methods to create new Elements, load existing Elements from the Working Store, and remove Elements from the Working Store. The first category of functionality is creating new Elements. New Elements can be created by specifying the C# Type (class) of the Element or by specifying the meta-class for the new Element. New Relationships can be created by specifying the C# Type or the meta-relationship to be instantiated, along with a list of role-players. When a new Element is created, the Element Class Factory 240 inserts default data rows into the appropriate tables in the working store, creates an Attribute Bag for the Element (e.g., memory location that selectively exposes data members), creates the Element (passing the Attribute Bag to the constructor), and returns the new Element to the caller.

When a new Relationship is created, the Element Class Factory 240 inserts data rows into the appropriate relationship tables. The role-player data can be set in the Working Store at this time. The Element Class Factory 240 then creates a Role Bag or location for the Relationship, creates the Relationship (passing the Role Bag to the constructor), and returns the new Relationship to the caller.

The second category of functionality for the Element Class Factory 240 is loading existing Elements. A subset of Elements to load can be specified:

(1) All Elements of a specified C# Type.
(2) All Elements of a specified C# Type meeting a set of attribute criteria.
(3) All Elements instantiating a specified meta-class.
(4) All Elements instantiating a specified meta-class meeting a set of attribute criteria.
(5) All Elements with ID's in a specified set of ID's.
(6) All Relationships instantiating a specified meta-relationship where a specified Element plays a particular role. (e.g., All SqlTableColumn relationships where TableA plays the ParentTable role.)
(7) All Elements playing a specified role in a particular meta-relationship where a specified Element plays a different specified role. (e.g., All Elements that are ChildColumns in a SqlTableColumn relationship with ParentTable TableA.)

The Transaction Manager 260 is responsible for creating transaction objects and keeping track of open transactions and their transaction level. Creating a new transaction when there is already an open transaction creates a new nested transaction with the current most-nested transaction as the parent. Client code determines whether the database connection has any open transactions and the current transaction depth. A depth of zero indicates that there are no open transactions. Client code will likely need access to the current inner-most transaction, so the Transaction Manager 260 should provide a way to access it.

Outermost transactions are used to track actions on the store for undo/redo purposes. Transactions that are outermost need to have ID's and a localized string description (e.g., "delete class CSeamWelder") useful for displaying in undo/redo UI. As a convenience to client code, the Transaction Manager 260 provides a method to perform an arbitrary store operation in a transaction. The DoAsTransaction method creates a new transaction with a name specified by the caller, and then calls an input delegate. If the delegate throws an exception, the exception is caught, the transaction rolled back, and the exception is re-thrown.

The Undo Manager 270 is responsible for manipulating Undo/Redo mechanisms in a Working Store. The Undo Manager 270 provides methods to Undo the last action and Redo the last Undo. Multiple Redo's are supported, so when an action is undone, and Undo is called, the previous action is undone, ad infinitum.

In addition it is often helpful to allow user to undo multiple steps at once. The Undo Manager 270 provides a method to undo all actions back to a specified transaction ID in a redo stack. Similarly, the Undo Manager 270 allows clients to redo undone actions up to a specified transaction ID in the redo stack. An associated user interface (UI) can display a list of transactions to be undone or redone. The Undo manager 270 can provide this functionality. It is conceivable that the undo or redo stack might need to be truncated at some point. The Undo Manager 270 provides methods to remove transaction ID's from bottom of the undo or redo stack to a particular transaction ID (e.g., from the beginning to transaction 21199).

Another aspect relating to the store 200 involves transactions. A Transaction object encapsulates a store transaction. Transactions have an ID, which is a GUID, a Name, and a Caption. A Name is a human readable string appropriate for use with the Undo Manager 270 and for debugging purposes. A Caption is a localized version of the Name. Transactions may be nested. Nested transactions are named in order that an SQL Server can distinguish between nested transactions. The SQL Server transaction name will not be seen by users, so the transaction name need not match the Transaction object name. Client code determines whether a particular Transaction object is outermost or, if not outermost, its transaction depth. An outermost Transaction has a transaction depth of one.

Transactions can be committed, which makes the work done in the transaction durable. In the presence of nested transactions, committing an outer transaction implicitly commits inner transactions. When a nested transaction is committed, the SQL Server transaction name is specified so SQL Server knows what the client code is trying to commit. When a nested Transaction is committed, its parent Transaction becomes the new innermost transaction. The Transaction Manager 260 keeps track of the current innermost transaction, so Transactions need to notify the Transaction when they are committed. Transactions also provide a way for the Transaction Manager 260 to find their parent Transaction. Transactions may also be rolled back, which abandons any changes made during the transaction. A Transaction is considered to be "active" until it is committed or rolled back. When the transaction has been committed or rolled back, the transaction is "inactive." It is an error to attempt to commit or roll back an inactive transaction.

Figure 3:
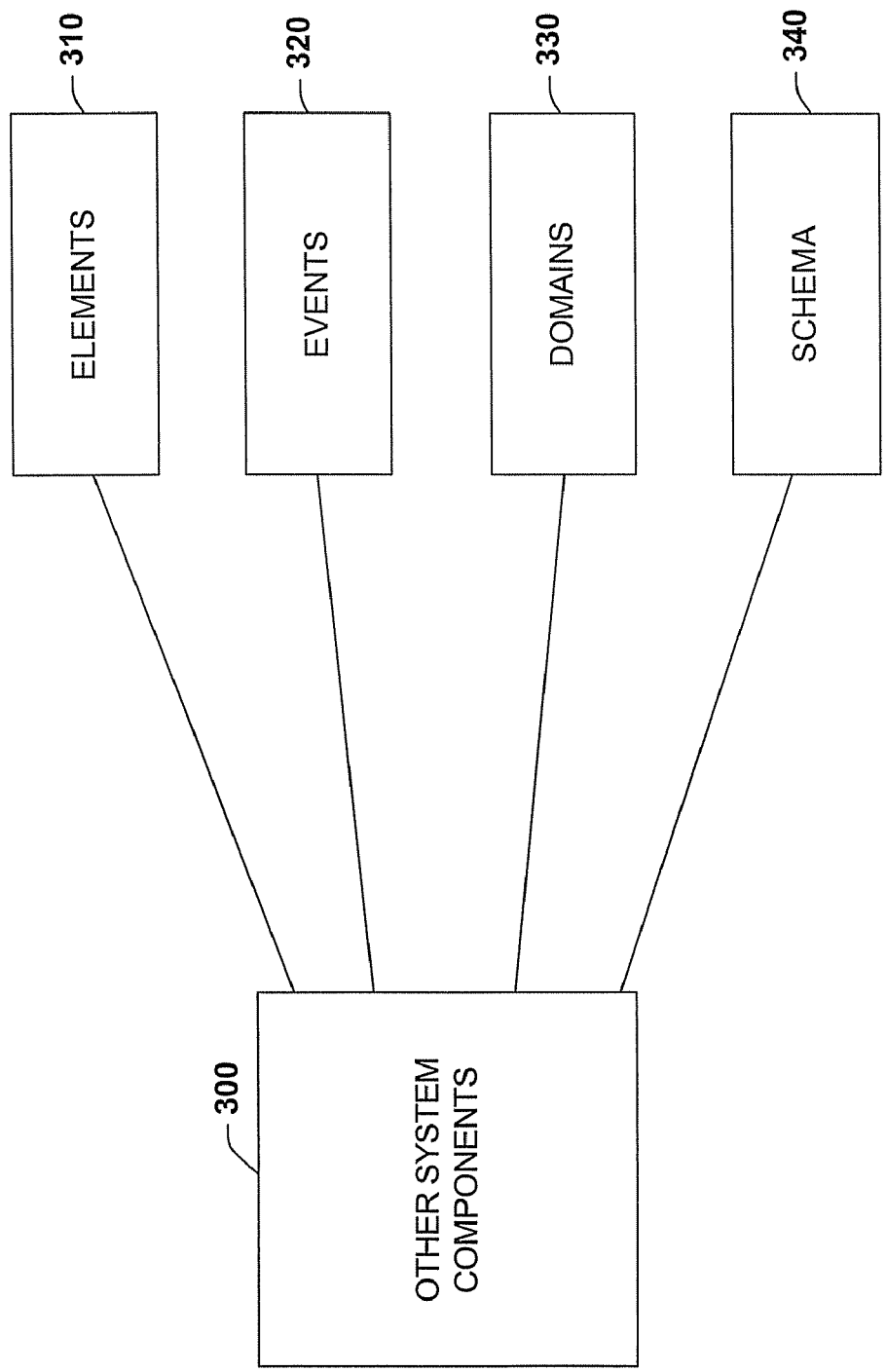
FIG. 3 is a diagram illustrating additional system components in accordance with an aspect of the present invention.

Turning now to FIG. 3, additional system components 300 that can be employed with meta-model objects are illustrated in accordance with an aspect of the present invention. These components can include elements 310, events 320, domains 330, and/or model schema 340. The Element 310 is an instance of a meta-class stored in a model. Element 310 can also be super-class of all model classes. Elements 310 provide a mechanism for the classes derived from Element to access their attribute data. Attribute data is generally exposed to clients of Element objects as CLR properties (or other type). Elements 310 are generally identified by a GUID. This identifier is typically exposed publicly so that certain operations, such as navigating relationships, can be performed. Elements may also be removed from the model.

The Events 320 are raised to keep various objects up-to-date with changes in the state of the system. For example, object-added events are raised to notify interested listeners when objects are added. The events 320 generally contain two (or more) other objects—the object raising the event and the event arguments. Composition of the event arguments varies with the type of the event, but is intended to be enough information to meaningfully respond to the event. For example, the event arguments for an object-added event contain a reference to the object that was added.

Events 320 can be raised at several levels. Store level events supply notifications of events that occur in a solution. Substore level events supply notifications for events that occur within a particular meta-model. Meta-class events provide notifications for instances of that meta-class or derived meta-class. Element events provide information on changes to an individual object.

Generally, there are two broad categories of events—Transactional and Atomic. Transactional events are events associated with a series of actions, generally caused by the operation of a database transaction. Atomic events are events for a single action. Transactional events have both "before" and "after" variants. Before-events are largely used to allow listeners to pre-empt an action by throwing an exception. After-events are mostly used to allow listeners to respond to a change. Transactional events include the following types:

Transaction Beginning (before)
Transaction Begun (after)
Transaction Committing (before)
Transaction Committed (after)
Transaction Rolling Back (before)

Transaction Rolled Back (after)
Element Events Begun (before)
Element Events Ended (after)

The event arguments for transaction events contain a reference to the Transaction object associated with the event.

Atomic events are notifications that some occurrence has happened. Atomic events include the following types:
Object Added
Object Removed
Object Attribute Changed Event arguments for object-added and object-removed events contain a reference to the element that was added or removed. Event arguments for object-changed events contain a reference to the changed element, a reference to the meta-attribute that was changed, and the old and new values of the attribute.

The domain 330 of an attribute is the definition of values that the attribute may take. For example, the length of an nvarchar column in SQL Server is an integer between 1 and 4000, so the domain for a SQL Server Column Length attribute is integers between 1 and 4000. Each domain typically has a default value. This is employed to populate attribute values when more restrictive constructors are not used to create the model class. This also provides a cue to the user as to what reasonable values for the attribute might be, for example the default length for nvarchar columns in a VS7 database designer is 50.

Domains 330 used by models are subsets of integers, unsigned integers, datetimes, or strings. While any value expressed as an integer, unsigned integer, or datetime would necessarily be a member of those respective Domains, in practice Domains used by model classes will typically have a value restriction. Minimum value, maximum value, or both with be specified for Domains derived from these value types. Strings, of course, are unlikely to have value restrictions in the same way integers may, but they can be restricted for string length and validation constraints may be applicable. For example, legal SQL Server identifiers start with a letter, underscore, dollar sign, or hash (#) character and are less than 129 characters in length. Regular expressions may be used to define the constraint.

Another type of domain 330 is an enumeration domain. Enumeration domains are analogous to C# enums. Enumeration domains are defined as explicit sets of integers, unsigned integers, or strings. The "base domain" for an enumeration domain is the domain which underlies the values of the domain—integers, unsigned integers, or strings. The base domain is used to determine what type of data should be used to store the value in the Working Store. String-Enumeration Domains conceptually combine the features of Enumeration Domain and String Domain. The additional feature String-Enumeration Domain supports is a method to get to the members of the domain. Restricted Length String Domain is a String Domain that restricts the lengths of strings in the domain.

The Model Schema 340 is an object which creates and maintains the structure of a schema in the Working Store. The Model Schema 340 creates the schema and the tables, triggers, constraints, and so forth contained in the schema. There are two types of model updates that might need to occur. A trivial update is one that does not involve structure changes. In this case, a version stamp is updated. A non-trivial update is one that involves a schema migration. In this case, a new database is created, the new schema is created, and the old data is migrated to the new database. During data migration from an old schema to a new schema, it may be necessary to disable relational integrity (RI) constraints in the database. When the migration is achieved, the RI constraints are then enabled. There is typically a Model Schema 340 for each Substore.

Figure 4:
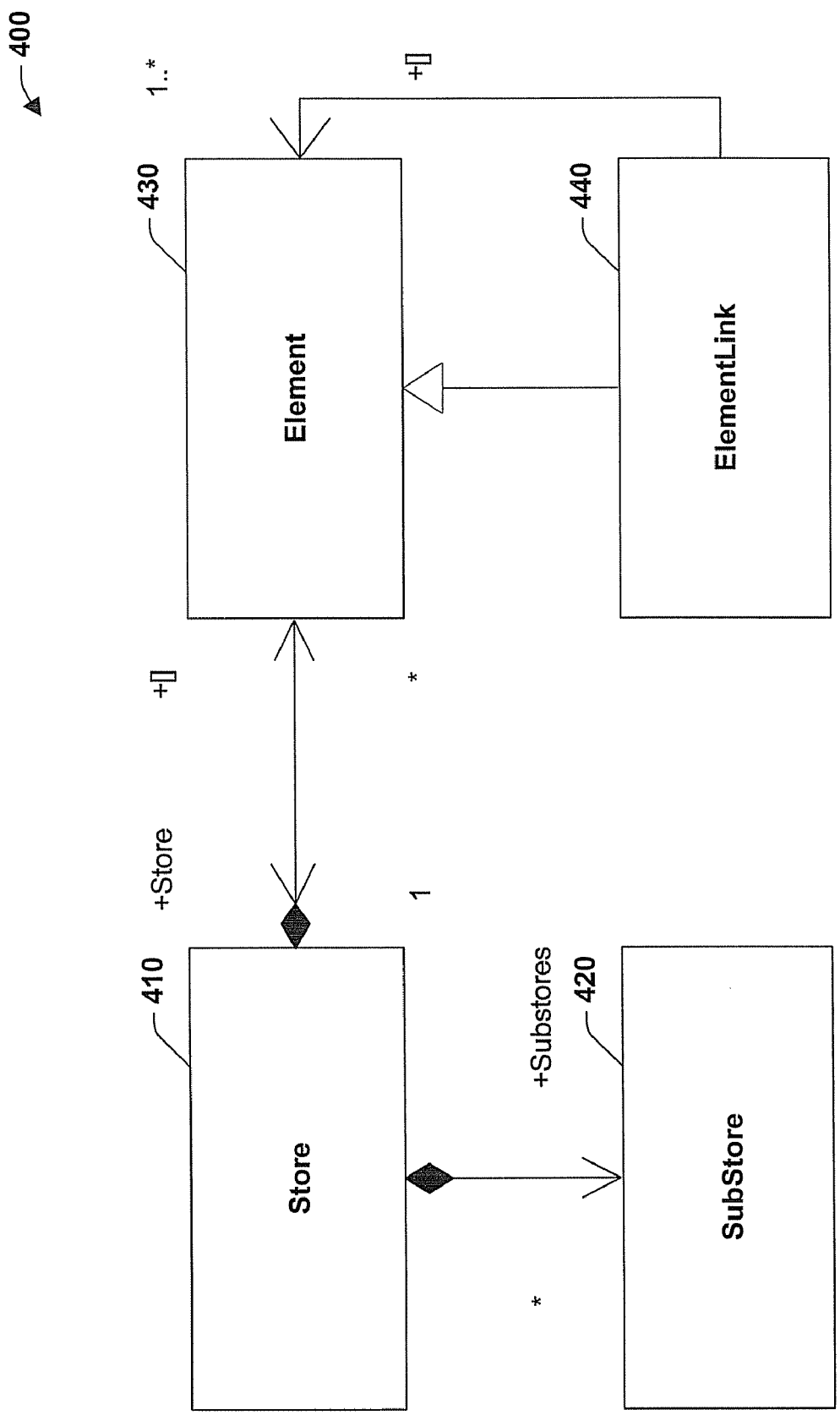
FIG. 4 is a diagram illustrating a store model in accordance with an aspect of the present invention.

FIG. 4 illustrates a store model 400 in accordance with an aspect of the present invention. A Store 410 is considered a complete model and is composed of one or more substores 420 that deal with specific aspects of a model. The model 400 depicts a high-level Unified Modeling Language (UML) model and includes elements 430 and element links 440.

Stores support public read-only properties such as Version, Substores and IsValid

| Version | Version |
|---|---|
| IEnumerable | Substores |
| Virtual bool IsValid | |

Version returns the version of the store 410 (i.e., the assembly's version). Substores returns a list of the substores. IsValid returns whether or not the store is in a valid state (i.e., not corrupted). IsValid does not raise an exception.
Stores support a public constructor with the signature:
   Store(SqlConnection connection)
Connection is a connection to the working store. Class Store also provides the following APIs.

| void | AddSubstore(Substore substore) |
|---|---|
| void | EnsureValid( ) |

Store also provides the following public properties.

| MetaDataDirecctory | MetaDataDirectory |
|---|---|
| ElementFactory | ElementFactory |
| ElementDirectory | ElementDirectory |
| MataDataDirectory | MataDataDirectory |
| UndoManager | UndoManager |
| TransactionManager | TransactionManager |
| EventManagerDirectory | EventManagerDirectory |
| IDictionary | SubStores |

Where

| MetaDataDirectory | Maintains the meta objects (e.g., MetaClassInfo, MetaRelationshipInfo, MetaAttributeInfo objects, . . . etc.) within the store object. During meta-model reflection process, meta objects will be added into this class via the MetaDataDirectory.Add method. For a given meta guid, this class also provides a Find method for the user to find a specific meta objects. |
|---|---|
| ElementFactory | Class factory for user to create model elements and links (i.e., instances of MetaClassInfo and MetaRelationshipInfo classes ). Namely, API CreateElement and CreateElementLink. The followings are the signatures of these APIs. |
| Element | CreateElement( Type metaClass, params AttributeAssignment[ ] assignments) |
| Element | CreateElement( MetaClassInfo metaClass, params AttributeAssignment[ ] assignments) |
| ElementLink | CreateElementLink( Type metaRelationship, IEnumerable rolePlayers, params AttributeAssignment[ ] assignments) |
| ElementLink | CreateElementLink(MetaRelationshipInfo metaRelationship, IEnumerable rolePlayers, params AttributeAssignment[ ] assignments) |

| | |
|---|---|
| ElementDirectory | Directory class for user to query IMS for model elements and links. It provides the look up based on model element guid or element type. |
| UndoManager | Handles IMS undo/redo functionality. |
| TransactionManager | Handles IMS transaction functionality. |
| EventManagerDirectory | Manages event model element notification. |
| WorkingStoreProxy | Proxy class to access database. It allows system to access the working store for element information. It has the following APIs. |
| SqlDataReader ExecuteReader(string cmdText) | |
| int | ExecuteNonQuery(string cmdText) |
| void | CreateDatabase( ) |
| void | CopyDatabase(SqlConnection fromConnection, Version fromVersion) |
| SubStores | Returns the substores collection. |

Class EventManagerDirectory has the following public properties which allow user to register various kinds of events.
  public TransactionBeginningEventManager TransactionBeginning
  public TransactionCommittedEventManager TransactionCommitted
  public TransactionRolledBackEventManager TransactionRolledBack
  public ElementEventsBegunEventManager ElementEventsBegun
  public ElementEventsEndedEventManager ElementEventsEnded
  public ElementAddedEventManager ElementAdded
  public ElementRemovedEventManager ElementRemoved
  public ElementAttributeChangedEventManager ElementAttributeChanged
  public RolePlayerChangedEventManager RolePlayerChanged
  public RolePlayerOrderChangedEventManager RolePlayerOrderChanged
EventManagerDirectory supports the functionality to AddElementAddedEvent, RemoveElementAddedEvent, AddElementAttributeChangedEvent, RemoveElementAttributeChangedEvent, AddElementRemovedEvent, RemoveElementRemovedEvent.
Class TransactionManager supports the following methods DoAsTransaction, BeginTransaction. These APIs are described in the followed event transaction section.
Class WorkingStoreProxy supports the following methods, ExecuteReader, ExecuteNonquery, CreateDatabase and UpdateDatabase to access element data in working store database.
Class ElementDirectory supports the following methods GetElement, GetElements, GetElementLinks, GetRolePlayers, RemoveElement. The following is the signatures of these APIs.

| | |
|---|---|
| Element | GetElement(Guid id) |
| ElementLink | GetElement(Guid id) |
| IEnumerable | GetElements(Type metaClass) |
| IEnumerable | GetElements(MetaClassInfo metaClass) |
| IEnumerable | GetElements(SQLDataReader elements) |
| IEnumerable | GetElementLinks(Guid rolePlayerId, MetaRoleInfo sourceRole) |
| IEnumerable | GetRolePlayers(Guid sourceRolePlayerId, MetaRoleInfo sourceRole, MetaRoleInfo targetRole) |
| void | RemoveElement(Guid id) |
| Element | CopyElement(guid copiedElementId) |
| MetaModelInfo | GetMetaModel(Type substoreClass) |
| MetaClassInfo | GetMetaClass(Type elementClass) |

Class MataDataDirectory supports the following methods Add, Find, FindMetaClass, FindMetaRelationship, FindMetaAttribute and FindMetaRole.

Figure 5:
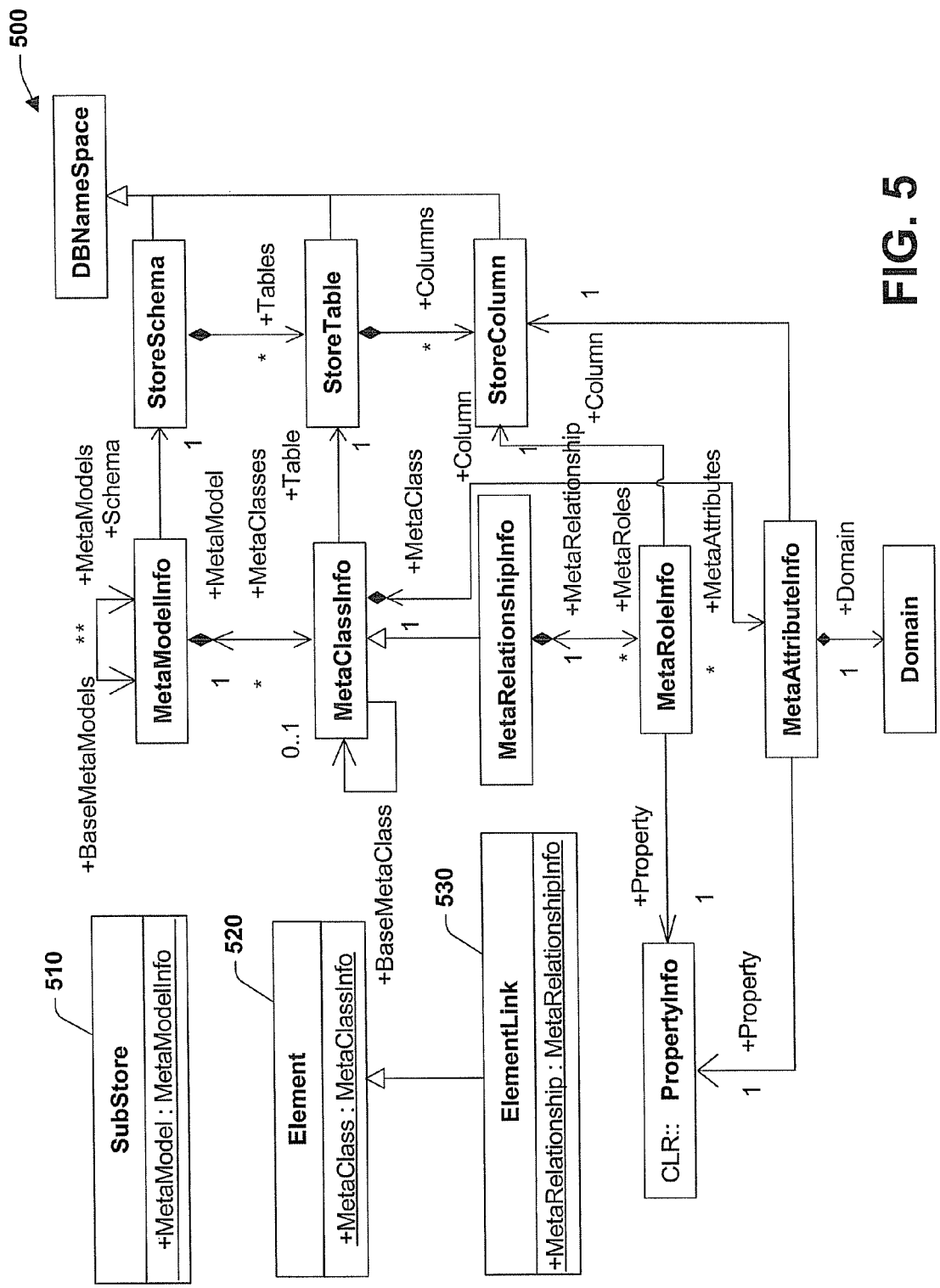
FIG. 5 is a diagram illustrating a substore model in accordance with an aspect of the present invention.

FIG. 5 depicts a substore model 500 in accordance with an aspect of the present invention the present invention. A Substore 510 is a portion of a store that deals with a particular type of model (e.g., UML and SQL Server meta-models). Substores 510 encapsulate a set of meta-classes through an associated meta-model and support public read-only properties Store, MetaModel, Version and IsValid with the signature:

| | |
|---|---|
| Store | Store |
| MetaModelInfo | MetaModel |
| virtual Version | Version |
| virtual bool | IsValid |

Store returns the store the substore belongs to. MetaModel returns meta-data about the substore's unique meta-model. Version returns the version of the store (i.e., the assemblies version). IsValid returns whether or not the substore is in a valid state (i.e., not corrupted). IsValid does not raise an exception.

Substores 510 support a public constructor with the signature:
  Substore(Store store)
Store is the store the substore is part of. The substore will register the meta-model instance with the store.

Substores support the public method CopySubstore, CreateDatabase, SchemaIsIdentical and EnsureValid with the signature:

```
virtual void CopySubstore(SqlConnection fromConnection,
    Version fromVersion)
virtual void CreateDatabase( )
virtual void EnsureValid( )
```

UpdateDatabase updates, without loosing data, the database to contain the current versions of the tables, stored procedures, etc. necessary to store the meta-model. EnsureValid attempts to correct corruption to the store to bring it into a valid state. CreateDatabase creates and populates non-default tables, stored procedures, etc. necessary to store models of this type. CopySubstore copies, without loosing data, the contents of the substore given by fromConnection to the current store assuming the copied substore has version fromVersion. EnsureValid raises an InvalidStore exception if it cannot make the substore valid.

Substores support the static public method SchemaIsIdenticalTo with the signature:

```
Version Version(SQLConnection connection)
bool SchemaIsIdenticalTo(Version version)
```

Version returns the version of the substore that is associated with connection. SchemaIsIdenticalTo returns whether or not the substore's schema is identical to schema version version. Substores 510 manage the meta-classes they own and register their meta-data with the MetaModelAttribute attribute, supply create methods for their meta-classes and provide events for adding, changing and removing their meta-classes. Classes in the same namespace as a substore that inherits from Element and has a MetaClassAttribute attribute is assumed to be a meta-class in the substore's meta-model.

An Element 520 is a meta-class instance (object) stored in a model. Elements are a specific instance of a meta-class. Elements contain attributes, which are defined by the corresponding meta-attribute. Meta-classes are organized into meta-models. Typically, element attributes will be exposed as $C^\#$ properties.

Elements support the public read-only properties ID, IsRemoved, Store, MetaClass and IsValid with the signature:

| | |
|---|---|
| Guid | ID |
| bool | IsRemoved |
| Store | Store |
| MetaClassInfo | MetaClass |
| virtual bool | IsValid |

ID returns the ID (GUID) of the element. IsRemoved returns whether or not the element has been removed from the store. Store returns the store the element belongs to. MetaClassInfo returns the element's meta-class attribute. IsValid returns whether or not the element is in a valid state (i.e., not corrupted). IsValid does not raise an exception Elements support protected constructors with the signatures:
Element( )
Element(SerializationInfo serializationInfo,
    StreamingContext context)
The second constructor is defined by ISerializable.
Elements support the public methods GetAttribute, GetAttributes, SetAttribute, SetAttributes, GetObjectData, Remove and EnsureValid with the signatures:

```
object    GetAttribute(MetaAttributeInfo metaAttribute)
IDictionary   GetAttributes(
              params MetaAttributeInfo[ ] attributes)
void SetAttribute(MetaAttributeInfo metaAttribute,
          object       value)
void SetAttributes(params AttributeAssignment[ ] assignments)
void SetAttributes(IEnumerable assignments)
IEnumerable   Relationships(MetaRoleInfo role)
IEnumerable   RolePlayers(MetaRoleInfo sourceRole,
              MetaRoleInfo targetRole)
virtual SerializationInfo GetObjectData(
    SerializationInfo serializationInfo,
    StreamingContext context)
void Remove( )
Element Copy( )
public Domain GetAttributeDomain( int index)
virtual void EnsureValid( )
```

GetAttribute returns the value of the attribute metaAttribute. GetAttributes returns the values of the attributes defined by attributes, the returned dictionary uses the values in attributes as keys. SetAttribute sets the attribute defined by metaAttribute (e.g., "Core.ModelElement.NameMetaAttribute") to value, in the working store (database). SetAttributes sets the attributes defined by assignments to values defined by assignments, in the working store (database). The assignments will be grouped to maximize performance and thus will happen in no guaranteed order. SetAttributes can be used as follows for parallel assignment:

element.SetAttributes(
    new    AttributeAssignment(Bar.NameMetaAttribute,
      "Foo"),
    new AttributeAssignment(Bar.SizeMetaAttribute, 3));

Relationships returns element links 530 where the current element plays role. RolePlayers returns the elements that play targetRole where the current element plays sourceRole. Remove removes the element from the store. Copy copies the element from the store. EnsureValid attempts to correct corruption to the element to bring it into a valid state. EnsureValid raises an InvalidStore exception if it cannot make the element valid. GetObjectData is defined by ISerializable.

Elements 520 support a public constructor with the signature:

| | |
|---|---|
| Element(Store | store, |
| Guid | id, |
| params AttributeAssignment[ ] | assignments) |

Store is the store the element is part of, id is the id of the element and assignments define the initial values of various attributes (unspecified attributes will be initialized to their default values).

An ElementLink 530 is a meta-relationship instance (tuple) stored in the model 500. ElementLink inherits from Element 520. ElementLinks 530 are a specific instance of a meta-relationship (MetaRelationship) and contain roles, which are defined by the corresponding meta-role (MetaRole). Typically, element link roles will be exposed as $C^\#$ properties.

ElementLinks 530 support the additional public read-only properties MetaRelationship and Roles with the signature:

| | |
|---|---|
| Element | [int roleNumber] |
| Element | [MetaRoleInfo role] |
| virtual MetaRelationshipInfo | MetaRelationship |
| virtual IEnumerable | Roles |

[ ] return the roleNumber'th role player (0 is the first role player). [ ] return the role player role. MetaRelationship returns the element link's meta-relationship. Roles returns the list of role players (elements).

ElementLinks 530 support the public method SetRole with the signature:
  void SetRolePlayer(MetaRoleInfo metaRole, Element rolePlayer)
  void SetRolePlayer(Guid metaRoleId, Element rolePlayer)
  void SetRolePlayer(int ordinalPos, Element rolePlayer)
  Element GetRolePlayer(MetaRoleInfo metaRole)
  Element GetRolePlayer(Guid metaRoleId)
  Element GetRolePlayer(int ordinalPos)

SetRolePlayer sets the role defined by metaRole (e.g., "Core.Element-Ownership.OwnedElementMetaRole"), metaRoleId or ordinalPos to rolePlayer, in the working store (database). RolePlayer should be non-null. Likewise, GetRolePlayer returns the role player for the passed in parameter.

ElementLinks 530 support a public constructor with the signature:

```
void ElementLink(Store        store,
                 Guid          id,
                 IEnumerable   roles,
                 params AttributeAssignment[ ] assignments)
```

Initialize initializes the element link where Store is the store the element is part of, id is the id of the element, roles is the list of elements that play roles and assignments define the initial values of various attributes (unspecified attributes will be initialized to their default values).

Figure 6:
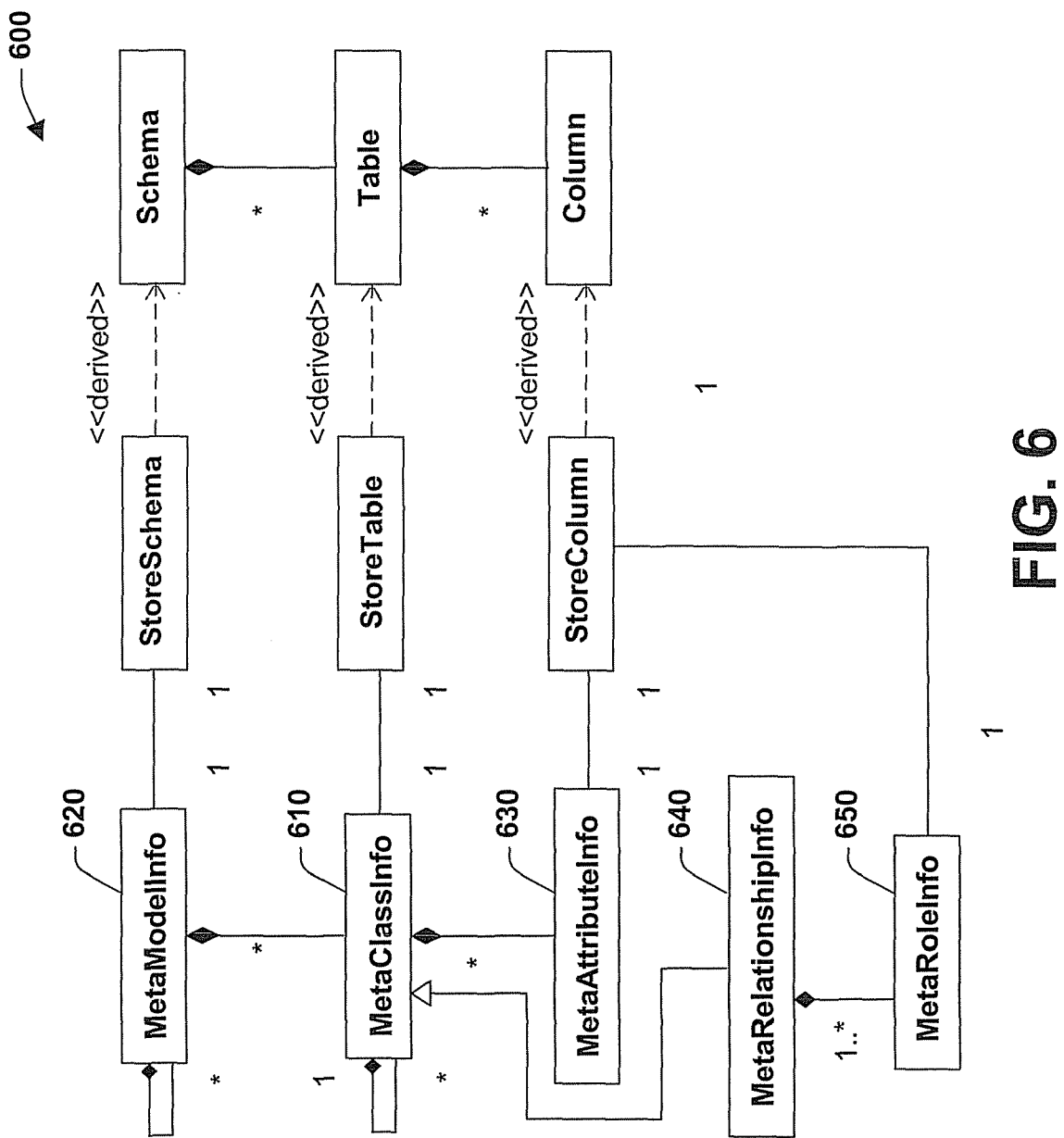
FIG. 6 is a diagram illustrating a meta-data model in accordance with an aspect of the present invention.

FIG. 6 is a diagram illustrating a meta-data model 600 in accordance with an aspect of the present invention. Meta-objects have associated meta-data as illustrated in the model 600. A meta-class has an associated MetaClassInfo object 610 that provides access to this meta-data. The meta-data for a meta-class records the ancestor meta-classes and working store table that instances of that meta-class are stored in. Meta-classes are partitioned into meta-models to mitigate name collisions and to support extension. Meta-models can extend other meta-models and are associated with a working store schema. Also, meta-classes may have meta-attributes, which correspond to working store columns.

A MetaDataInfo holds the basic meta-data for a meta-data object. MetaDataInfo is an abstract class. The class MetaDataInfo supports public read-only properties ID, Name and Caption, with the following signatures:

Guid ID
string Name
string Caption

ID returns the ID (GUID) of the meta-data object. Name returns a white space free name for the meta-data object that does not change with locale (e.g., "Core"). Caption returns a localized name for the meta-data object, which may contain white space.

The class MetaDataInfo supports an internal constructor with the signature:

```
MetaDataInfo(Guid id,
             string name,
             string captionKey)
```

Id is the ID of the meta-data object, name is a white space free name for the meta-data object that does not change with locale (e.g., "Core") and captionKey is the name (key) of the resource that contains the localized name for the meta-model (which may contain white space).

Respective meta-objects defined in an assembly have a managed system (e.g., Common Language Runtime) attribute decorating them. That is, along with some other [MetaXXXX] specified in the following sections, one needs to also provide this attribute [MetaObject]. The constructor of this MetaObjectAttribute has the following signature.

Public MetaObjectAttribute(string Id, string captionKey);
Id is the guid (in the form "AE671BDC-41B2-44d5-832B-BE0FEC502526") of this meta object. CaptionKey is the name (key) to the translated caption. This allows the system to provide translated strings to the client.

A MetaModelInfo 620 holds the meta-data for a meta-model. MetaModelInfo 620 inherits from MetaDataInfo. Meta-model meta-data is used, for example, to determine which database schema stores the meta-model instance. There is typically a single read-only instance per meta-model. Meta-model meta-data supports public read-only properties ID, BaseMetaModel, Name, Caption, MetaModels, MetaClasses, Substore, and Schema with the following signatures:

```
IEnumerable BaseMetaModels
IEnumerable MetaModels
IEnumerable MetaClasses
Type        SubstoreType
StoreSchema Schema
```

ID returns the ID (GUID) of the meta-model. BaseMetaModels returns the meta-model's parent meta-models (generally, only the Base meta-model has no parent meta-models). Name returns a white space free name for the meta-model that does not change with locale. Caption returns a localized name for the meta-model, which may contain white space. MetaModels returns the list of meta-models directly extending the meta-model (i.e., the meta-models with the meta-model as their parent meta-model). MetaClasses returns a list of the meta-classes directly in the meta-model. SubstoreType returns type of the substore class that meta-model corresponds to. Schema returns the schema the meta-model corresponds to in the working store (database).

Meta-model meta-data support an internal constructor with the signature:

```
MetaModelInfo(MetaModelID id,
              IEnumerable baseMetaModelInfos,
              string      captionKey,
              Type        substoreType,
              StoreSchema schema)
```

Id is the ID of the meta-model, baseMetaModelInfos are the meta-model's parent meta-models (e.g., the array {CoreMetaModel, ProcessMetaModel}), captionKey is the name (key) of the resource that contains the localized name for the meta-model (which may contain white space), substoreType is the type of substore class that corresponds to the meta-model and schema is the SQL Server schema the meta-model contents are stored in, in the working store. BaseMetaModelInfo can be updated to reflect the new meta-model meta-data (provided baseMetaModelInfo is non-null).

A MetaModelAttribute declares the base models the associated meta-model bases/extends upon. Substores that have this attribute are treated as meta-models by the store. Further, classes descended from Element with a MetaClassAttribute and MetaObject in the same namespace are treated as meta-classes of the meta-model.

Meta-model attributes constructor has the following signature:
public MetaModelAttribute(string ID, string captionKey, String [ ] baseModelList);
ID is the meta-model guid. captionKey is the name(key) to the access the resource manager in IMS to provide the localized string to the client. baseModelList is an array of strings. Each string (e.g., in the form "AE671BDC-41B2-44d5-832B-BE0FEC502526") specifies the base model this model extends from.

The MetaClassInfo 610 holds the meta-data for a meta-class. MetaClassInfo inherits from MetaDataInfo. A meta-class may have at most one parent meta-class it inherits from. Meta-classes are used, for example, to determine which database tables store the meta-class. There is typically only a single read-only instance per meta-class.

Meta-classes support public read-only properties ID, BaseMetaClass, MetaModel, Name, Caption, MetaAttributes, AllMetaAttributes, MetaClass, Table, DirectChildClasses, ChildClasses, DefaultProperty, MetaRolesPlayed, with the following signatures:

| | |
|---|---|
| MetaClassInfo | BaseMetaClass |
| MetaModelInfo | MetaModel |
| IList | MetaAttributes |
| IList | AllMetaAttributes |
| Type | ImplementationClass |
| StoreTable | Table |
| IList | DirectChildClasses |
| IList | ChildClasses |
| string | DefaultProperty |
| IList | MetaRolesPlayed |

ID returns the ID (GUID) of the meta-class. BaseMetaClass returns the meta-class's parent meta-class or null if there is no parent meta-class. MetaModel returns the meta-model of the meta-class. Name returns a unique white space free name for the meta-class that does not change with locale (e.g., "Core.ModelElement"). Caption returns a localized name for the meta-class, which may contain white space. MetaAttributes returns a list of the meta-attributes added by the meta-class. AllMetaAttributes returns a list of all the meta-attributes (includes attributes from it's parent classes). MetaClass returns the class that implements the meta-class. Table returns the table the meta-class corresponds to in the working store (database). DirectChildClasses returns a read-only list of derived class (includes the direct and indirect inherited child classes.). ChildClasses returns a read-only list of immediately derived class. DefaultProperty returns the default property name (This is used with property grid to specify the default highlighted property within the grid.). MetaRolesPlayed returns a read-only list of meta-roles this meta-class played.

Meta-classes support the internal constructor with the signature:

| | |
|---|---|
| MetaClassInfo(Guid | id, |
| MetaClassInfo | baseMetaClass, |
| MetaModelInfo | metaModel, |
| string | captionKey, |
| Type | implementationClass, |
| StoreTable | table) |

Id is the ID of the meta-class, baseMetaClass is the parent meta-class of the meta-class (null if it is the top level meta-class element), metaModel is the containing meta-model of the meta-class, implementationClass is the class that implements the meta-class, captionKey is the name (key) of the resource that contains the localized name for the meta-class (which may contain white space), and table is the SQL Server table the meta-class contents are stored in, in the working store. The new meta-class can be added to metaNamespace.

The class MetaClassInfo supports the methods GetMetaAttribute, IsAssignableFrom and IsSubclassOf with the signatures:
   MetaAttributeInfo FindAttribute(string name)
   bool IsAssignableFrom(MetaClassInfo metaClass)
   bool IsSubclassOf(MetaClassInfo metaClass)
   Internal ArrayList GetAttributeDefaultValues( )

GetMetaAttribute returns the meta-attribute in the meta-class named name or raises an ArgumentOutOfRangeException if there is no matching meta-class. IsAssignableFrom returns whether or not metaClass is a submeta-class (or the same meta-class) as the meta-class. IsSubclassOf returns whether or not the meta-class is a subclass of metaClass. GetAttributeDefaultValues returns a list of default values for the attributes in the class. This sets up attributes' initial value when creating new model element.

A MetaClassAttribute declares the meta-model owner for meta-classes. Classes that derive from Element and have this attribute and MetaObject attribute are treated as meta-classes by the store. Further, properties with a MetaAttributeAttribute and MetaObject in the class are treated as meta-attributes of the meta-class.

Constructor for Meta-class attributes has the following signature:
   Public MetaClassAttribute(string owningMetaModelID);
owningMetaModelID is the GUID of the meta-model (e.g., in the form "AE671BDC-41B2-44d5-832B-BE0FEC502526") which this meta class belongs to.

A MetaAttributeInfo 630 is the meta-data for a meta-attribute of a meta-class. MetaAttributeInfo inherits from MetaDataInfo. Meta-attributes are used, for example, to determine which database columns store the meta-attribute. There is typically only a single read-only instance per meta-attribute.

Meta-attributes support the public get properties ID, MetaClass, Domain, Name, Caption, Property and Column with the signatures:

| | |
|---|---|
| Guid | ID |
| MetaClassInfo | MetaClass |
| Domain | Domain |
| string | Name |
| string | Caption |
| PropertyInfo | Property |
| StoreColumn | Column |
| object | DefaultValue |
| Bool | Browsable |
| Bool | Mergeable |
| bool | HasCategoryName |
| string | CategoryName |
| RefreshProperties | RefreshProperties |

ID returns the ID (GUID) of the meta-attribute. MetaClass returns the meta-class of the meta-attribute. Domain returns the domain (type) of the meta-attribute. Name returns a white space free name for the meta-attribute that does not change with locale (e.g., "Core.ModelElement.Name"). Caption returns a localized name for the meta-attribute, which may contain white space. Property returns the property that corresponds to the meta-attribute. Column returns the SQL Server column the attribute is stored in, in the working store (database). DefaultValue returns the default value of the meta-attribute. Browsable is to indicate whether this attribute can be browsed in property grid. During the reflection process, attribute [Browsable] associated with the attribute will be reflected. This allows the system to provide proper property descriptor to the grid. Mergeable indicates whether same attribute can be merged within same type of model element within the grid. CategoryName allows the attribute to be placed under a different category (default for grid is under "Misc" category) in the property grid. RefreshProperties indicates the refreshing policy when this attribute values changes (Possible values are All, None, and Repaint, for example. Meta-attributes support the internal constructor with the signature:

```
MetaAttributeInfo(Guid    id,
    MetaClassInfo         metaClass,
    Domain                domain,
    string                captionResource,
    PropertyInfo          property,
    StoreColumn           column
    object                default)
```

Id is the ID of the meta-attribute, metaClass is the meta-class of the meta-attribute, domain is the domain of the meta-attribute, captionResource is the name of the resource that contains the localized name for the meta-attribute (which may contain white space), property is the property that corresponds to the meta-attribute, column is the SQL Server column the meta-attribute is stored in, in the working store, and default is the default value of the meta-attribute. The new meta-attribute will be added to metaClass.

A MetaAttributeAttribute declares the meta-attributes in meta-class. Properties of meta-classes that have this attribute and MetaObjectAttribute are treated as meta-attributes by the store.

A MetaRelationshipInfo 640 holds the meta-data for a meta-relationship. MetaRelationshipInfo inherits from MetaDataInfo. A meta-relationship is a special type of meta-class. Meta-relationships are used, for example, to determine which database tables store the meta-relationship. There is typically a single read-only instance per meta-relationship.

Meta-relationships support the additional public read-only property MetaRoles with the following signature:
IEnumerable MetaRoles
MetaRoles returns the meta-roles of the meta-class.
Meta-roles support the internal constructor with the signature:

```
MetaRelationshipInfo(Guid   id,
    MetaClassInfo           baseMetaClass,
    MetaModelInfo           metaModel,
    string                  captionResource,
    Type                    metaClass,
    StoreTable              table)
```

The parameters of the constructors are defined in MetaClassInfo.

A MetaRelationshipAttribute declares the meta-model owner ID for meta-relationships. Classes that derive from ElementLink and have this attribute and MetaObjectAttribtue are treated as meta-relationships by the store. Further, properties of the class with a MetaRoleAttribute and MetaObjectAttribute are treated as meta-roles of the meta-class.

Meta-relationship constructor has the following signature.
Public MetaRelationship(string owningMetaModelID)
owningMetaModelID is the meta model GUID this meta-relationship (e.g., in the form "AE671BDC-41B2-44d5-832B-BE0FEC502526") belongs to.

A MetaRoleInfo 650 holds the meta-data for a meta-role. MetaRoleInfo 650 inherits from MetaDataInfo. A meta-role is a role that a meta-relationship plays with a meta-class. Meta-roles are used, for example, to determine which database columns store the meta-role. There is typically a single read-only instance per meta-role. Meta-roles support the additional public read-only properties ID, MetaRelationship, RolePlayer, Name, Caption, Property, Column, IsOptional, IsAggregate IsNavigableFrom, Cardinality, PropagateRemove, IsOrdered, and PropertyCopyTargetPlayer with the following signatures:

```
Guid                    ID
MetaRelationshipInfo    MetaRelationship
MetaClassInfo           RolePlayer
string                  Name
string                  Caption
PropertyInfo            Property
StoreColumn             Column
bool                    IsOptional
bool                    IsAggregate
bool                    IsNavigableFrom
Bool                    PropagateRemove
enum Cardinality        : int {Many = int.MaxValue, One = 1}
Cardinality             Cardinality
bool                    PropertyCopyTargetPlayer
bool                    PropagateRemove
```

ID returns the ID (GUID) of the meta-role. MetaRelationship returns the meta-relationship of the meta-role. RolePlayer returns the meta-class that plays this role. Name returns a white space free name for the meta-role that does not change with locale (e.g., "Core.ElementOwnership.Visibility"). Caption returns a localized name for the meta-role, which may contain white space. Property returns the property that corresponds to the meta-role. Column returns the SQL Server column the role is stored in, in the working store (database). IsOptional returns whether or not the role is optional. IsAggregate returns whether or not the role player contains the other role players of the relationship (e.g., a table contains its columns). IsNavigableFrom returns whether or not it is efficient to find all the element links that have a given element as the role player. Cardinality returns the cardinality of the role (i.e., given specific elements that play the other roles in the relationship how many element links, if any, play the role). PropagateRemove returns whether or not the role player should be removed when the element link is removed.

ElementLink is automatically removed when the role player is removed. This flag allows the system to remove the opposite role players automatically. This is useful for parent-child relationship. When parent model is removed, child element is removed as part of the remove operation. IsOrdered indicates whether the role players play this meta-role are ordered. PropertyCopyTargetPlayer indicates whether the target player should be copied when the source player is being copied. Again, this is useful during a parent-child relationship. When parent model element is copied, the child element should automatically be copied as well.

Meta-roles support the internal constructor with the signature:

```
MetaRoleInfo(Guid         id,
    MetaRelationshipInfo  metaRelationship,
    MetaClassInfo         rolePlayer,
    string                captionResource,
    PropertyInfo          property,
    StoreColumn           column,
    bool                  isOptional,
    bool                  isAggregate,
    bool                  isNavigableFrom,
    bool                  propagateRemove,
    bool                  propagateCopyTargetPlayer,
    bool                  isOrdered,
    Cardinality           Cardinality)
```

Id is the ID of the meta-attribute, metaRelationship is the meta-relationship of the meta-role, rolePlayer is the meta-class of the meta-role, captionResource is the name of the resource that contains the localized name for the meta-role (which may contain white space), property is the property that corresponds to the meta-role, column is the SQL Server column the meta-role is stored in, in the working store, is Optional is whether or not the role is optional, is Aggregate is whether or not the role contains other roles of the relationship, is NavigableFrom is whether or not the role is navigable from, propegateRemove is whether or not the role player should be removed when the element link is removed and Cardinality is the cardinality of the role. propagateCopyTargetPlayer indicates whether the target player should be copied when the source role player is being copied. isOrdered indicates whether the role player is maintained in an ordered list. The new meta-role will be added to metaRelationship.

A MetaRoleAttribute declares a meta-role in the meta-relationship. Properties of meta-relationship that have this attribute are treated as meta-roles by the store. Meta-role attribute constructor does not have any parameters.

Meta-role attributes support the following named parameters:

| | |
|---|---|
| bool | IsOptional |
| bool | IsAggregate |
| bool | IsNavigableFrom |
| bool | PropagateRemove |
| bool | PropagateCopy |
| Cardinality | Cardinality |

IsOptional is the whether or not the role is optional (by default true), IsAggregate is whether or not the role is composite (by default false), IsNavigableFrom is whether or not the role is navigable from (by default false), PropegateRemove is whether or not the role player should be removed when the element link is removed (by default false) and Cardinality is the cardinality of the role (by default Many). PropagateCopy is whether or not the target role player should be copied when source role player is copied. The name and other properties of the meta-role are derived through reflection.

Figure 7:
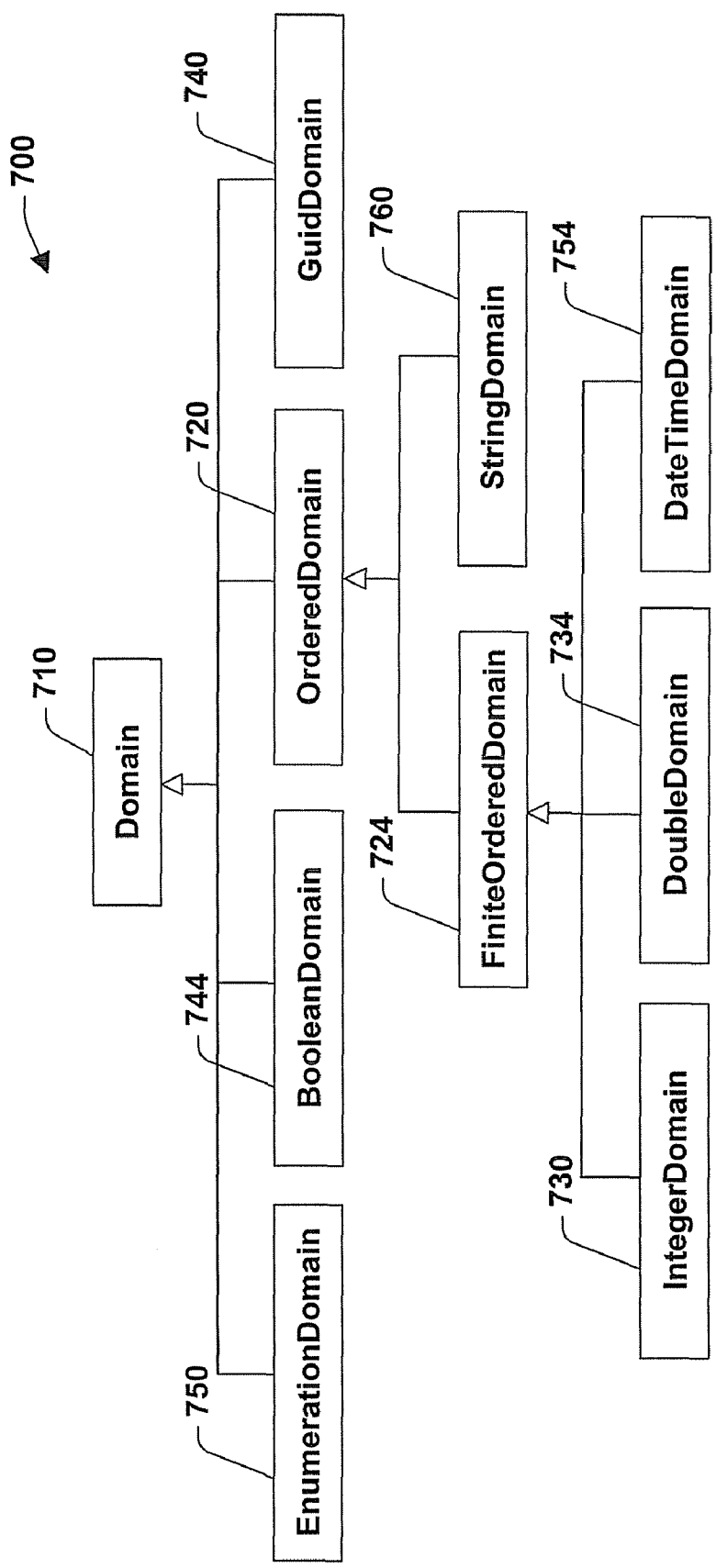
FIG. 7 is a diagram illustrating a domain model in accordance with an aspect of the present invention.

FIG. 7 is a diagram illustrating a domain model 700 in accordance with an aspect of the present invention. A Domain 710 is a domain (type) of a meta-attribute and is an abstract class. Domains support the public read-only property DefaultValue with the following signature:
 abstract string SQLType
DefaultValue returns the default value for this domain (normally the initial value for the corresponding CLR type).

The class Domain supports the methods CreateEditor, Contains and Caption with the following signatures:

| | |
|---|---|
| abstract Control | CreateEditor( ) |
| abstract bool | Contains(object value) |
| abstract string | Caption(object value) |

CreateEditor returns a control for inputting values in the domain. Contains returns whether or not the value is in the domain. Caption returns the localized text representation of value (which is in the domain).

An OrderedDomain 720 is a domain that has a total ordering on it. OrderedDomain is an abstract class. Values in this domain support the IComparable interface.

A FiniteOrderedDomain 724 is an ordered domain that is finite (and thus bounded above and below). FiniteOrderedDomain is an abstract class. The class FiniteOrderedDomain supports public read-only properties HasRestrictedMinimum, HasRestrictedMaximum, Minimum and Maximum with the following signatures:

| | |
|---|---|
| abstract bool | HasRestrictedMinimum |
| abstract bool | HasRestrictedMaximum |
| abstract IComparable | Minimum |
| abstract IComparable | Maximum |

HasRestrictedMaximum returns whether or not the domain has a maximum value other than that imposed by the underlying type. HasRestrictedMinimum returns whether or not the domain has a minimum value other than that imposed by the underlying type. Minimum returns the minimum value in the domain. Maximum returns the maximum value in the domain. The class FiniteOrderedDomain supports the public methods Contains and Caption with the following signatures:
 override bool Contains(object value)
Contains returns whether or not the value is in the domain (i.e., Minimum.CompareTo(value)<=0 && Maximum.CompareTo(value)>=0). If HasContinuousRange is false then Contains will raise an assert and an InvalidOperationException exception since the implementation assumes a continuous range.

An IntegerDomain 730 is a finite ordered domain that corresponds to a C# int (or other type). The class IntegerDomain supports public read-only properties SqlType, HasRestrictedMinimum, HasRestrictedMaximum, Minimum and Maximum with the following signatures:

| | |
|---|---|
| override string | SqlType |
| override bool | HasRestrictedMinimum |
| override bool | HasRestrictedMaximum |
| override IComparable | Minimum |
| override IComparable | Maximum |

SqlType returns "int". HasRestrictedMinimum returns Minimum !=Int32.MinValue. HasRestrictedMaximum returns Maximum !=Int32.MaxValue. Minimum returns Int32.MinValue unless a minimum is specified in the constructor. Maximum returns Int32.MaxValue unless a maximum is specified in the constructor.

The class IntegerDomain supports the public methods CreateEditor and Caption with the following signatures:

| | |
|---|---|
| override Control | CreateEditor( ) |
| override string | Caption(object value) |

CreateEditor returns a control for inputting values in the domain (a TextBox with a NumericFormat). Caption returns the localized text representation of value (which is in the domain). The class IntegerDomain supports the constructor with the signature:

| |
|---|
| IntegerDomain( ) |
| IntegerDomain(int min, |
|     int max, |
|     Int defaultInt) |

Min is the minimum of the domain and max is the maximum of the domain. The parameterless constructor sets the range of the domain to [Int32.MinValue, Int32.MaxValue]. defaultInt is the default integer value for this domain.

A DoubleDomain 734 is a finite ordered domain that corresponds to a C# double (or other code type). The class DoubleDomain supports public read-only properties SqlType, HasRestrictedMinimum, HasRestrictedMaximum, Minimum and Maximum with the following signatures:

| | |
|---|---|
| override string | SqlType |
| override bool | HasRestrictedMinimum |
| override bool | HasRestrictedMaximum |
| override IComparable | Minimum |
| override IComparable | Maximum |

SqlType returns "float". HasRestrictedMinimum returns Minimum !=Double.MinValue. HasRestrictedMaximum returns Maximum !=Double.MaxValue. Minimum returns Double.MinValue unless a minimum is specified in the constructor. Maximum returns Double.MaxValue unless a maximum is specified in the constructor.

The class DoubleDomain supports the public methods CreateEditor and Caption with the following signatures:

| | |
|---|---|
| override Control | CreateEditor( ) |
| override string | Caption(object value) |

CreateEditor returns a control for inputting values in the domain (a TextBox with a NumericFormat). Caption returns the localized text representation of value (which is in the domain). The class DoubleDomain supports the constructor with the signature:

| |
|---|
| DoubleDomain( ) |
| DoubleDomain(double min, |
| double max, |
| double defaultDouble) |

Min is the minimum of the domain and max is the maximum of the domain. The parameter-less constructor sets the range of the domain to [Double.MinValue, Double.MaxValue]. defaultDouble is the default double value for this double domain.

A GuidDomain 740 is a domain that corresponds to a C# Guid (or other code type). The class GuidDomain supports public read-only property SqlType with the following signature:

override string SqlType

SqlType returns "uniqueidentifier". The class GuidDomain supports the public methods CreateEditor and Caption with the following signatures:

| | |
|---|---|
| override Control | CreateEditor( ) |
| override string | Caption(object value) |

CreateEditor returns a control for inputting values in the domain (a TextBox with a GenericFormat). Caption returns the localized text representation of value (which is in the domain). The class GuidDomain supports the constructor with the signature:

GuidDomain(string defaultGuidValue)

defaultGuidValue is the default guid value for this domain.

A BooleanDomain 744 is a domain that corresponds to a C# bool (or other code type). The class BooleanDomain supports the public read-only property SqlType with the following signature:

override string SqlType

SqlType returns "bit". The class GuidDomain supports the public methods CreateEditor and Caption with the following signatures:

| | |
|---|---|
| override Control | CreateEditor( ) |
| override string | Caption(object value) |

CreateEditor returns a control for inputting values in the domain (a CheckBox). Caption returns the localized text representation of value (which is in the domain). The class BooleanDomain supports the constructor with the signature:

BooleanDomain(bool defaultBooleanValue)

defaultBooleanValue is the default value for this domain.

An EnumerationDomain 750 is a finite ordered domain that corresponds to a C# Enum (or other code type). The class EnumerationDomain supports public read-only properties HasRestrictedMinimum, HasRestrictedMaximum, Minimum, Maximum, Enumeration and BaseDomain with the following signatures:

| | |
|---|---|
| override bool | HasRestrictedMinimum |
| override bool | HasRestrictedMaximum |
| override IComparable | Minimum |
| override IComparable | Maximum |
| Type | Enumeration |
| Domain | BaseDomain |
| override string | SqlType |
| bool | IsFlagSet |

HasRestrictedMinimum returns true. HasContinuousRange returns true. Minimum returns the first value in the enumeration. Maximum returns the last value in the enumeration. Enumeration returns the enumeration that the domain is based on. BaseDomain returns the domain the enumeration is based on. SqlType returns "int" or "bigint" (depending on the base type of the enumeration). IsFlagSet returns whether or not members of the domain should be treated as a set of flags. The class EnumerationDomain supports the methods CreateEditor, Contains and Caption with the following signatures:

| | |
|---|---|
| override Control | CreateEditor( ) |
| override bool | Contains(object value) |
| override string | Caption(object value) |

CreateEditor returns a control for inputting values in the domain (a ComboBox or, if IsFlagSet, a ListBox with CheckBox child controls). Contains returns whether or not the value is in the domain. Caption returns the localized text representation of value (which is in the domain). The class EnumerationDomain supports the constructor with the signature:

| |
|---|
| EnumerationDomain(Type enumeration, |
| string captionResources[ ], |

```
Bool isFlagSet,
object defaultEnum)
```

Enumeration is the enumeration type of the domain. CaptionResources is the resource IDs of the localized names of each value in the enumeration. isFlagSet indicates whether this is bit-wise enum field or not. defaultEnum is the default value for the enum domain.

A DateTimeDomain 754 is a finite ordered domain that corresponds to a $C^\#$ DateTime (or other code type). The class DateTimeDomain supports public read-only properties HasRestrictedMinimum, HasRestrictedMaximum, Minimum and Maximum with the following signatures:

```
override bool         HasRestrictedMinimum
override bool         HasRestrictedMaximum
override IComparable  Minimum
override IComparable  Maximum
override string       SqlType
```

HasRestrictedMinimum returns false. HasRestrictedMaximum returns false. Minimum returns DateTime.MinValue. Maximum returns DateTime.MaxValue. SqlType returns "bigint". The class DateTimeDomain supports the public methods CreateEditor and Caption with the following signatures:

```
override Control  CreateEditor( )
override string   Caption(object value)
```

CreateEditor returns a control for inputting values in the domain (a DateTimePicker). Caption returns the localized text representation of value (which is in the domain). The class DateTimeDomain supports the constructor with the signature:

DateTimeDomain(DateTime minVal, DateTime maxVal, DateTime defaultVal)

minVal is the minimum of the domain, maxVal is the maximum of the domain and defaultVal is the default datetime value for this domain. The parameter-less constructor sets the range of the domain to [DateTime.MinValue, DateTime.MaxValue].

A StringDomain 760 is an ordered domain that corresponds to a $C^\#$ string (or other code type). The class StringDomain supports public read-only properties SqlType and MaxLength with the following signature:

```
override string  SqlType
         int     MaxLength
```

SqlType returns "nvarchar(MaxLength)", if MaxLength is less than or equal to 4000, otherwise SqlType returns "nvarchar(MaxLength)", if MaxLength is greater than 4000.

The class StringDomain supports the methods CreateEditor, Contains and Caption with the following signatures:

```
override Control  CreateEditor( )
override bool     Contains(object value)
override string   Caption(object value)
```

CreateEditor returns a control for inputting values in the domain (a TextBox). Contains returns true. Caption returns the localized text representation of value (which is in the domain). The class StringDomain supports the constructor with the signature:

StringDomain(int maxLength, string defaultString)

MaxLength is the maximum length of the string (at least 1 and to $2^{31}=1$). defaultString is the default value for this string domain.

Figure 8:
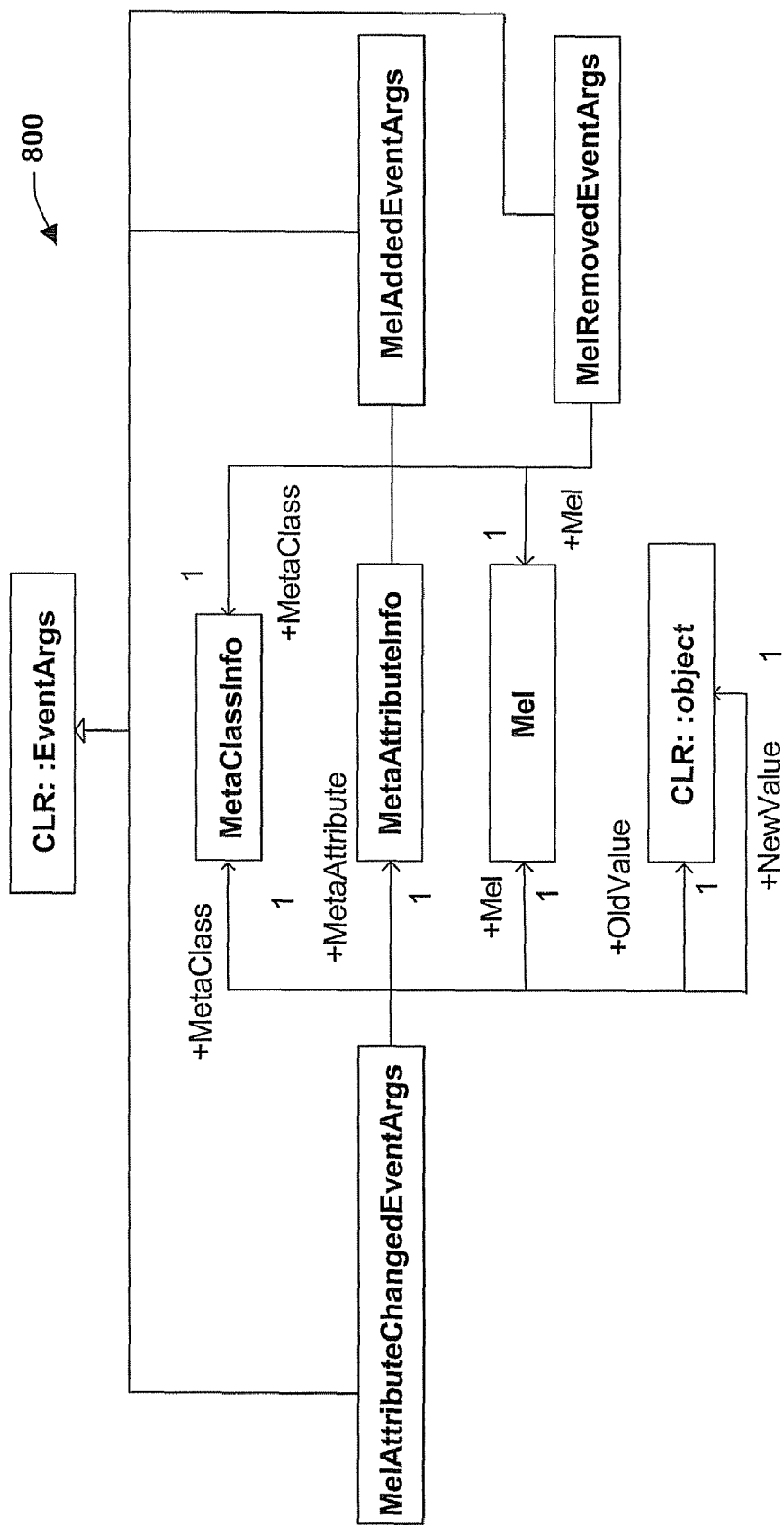
FIG. 8 is a diagram illustrating an event model in accordance with an aspect of the present invention.

FIG. 8 is a diagram illustrating an event model 800 in accordance with an aspect of the present invention. This model depicts such aspects as adding and removing elements as is discussed in more detail below. An AttributeAssignment represents an assignment of a value to an attribute in a particular object. It is used to specify parallel assignment of element attributes. The class AttributeAssignment supports the public get properties MetaAttribute and Value with the signatures:

```
MetaAttributeInfo  MetaAttribute
object             Value
```

The class AttributeAssignment supports the constructor with the signature:

```
AttributeAssignment(MetaAttributeInfo metaAttribute
                    object             value)
```

MetaAttribute is the attribute to be assigned to. Value is the value to be assigned.

Events are $C^\#$ events (or other code type) that raise as a result of changes to an element's state (e.g., changed meta-attribute values) or the store's state (e.g., an element being added or removed from the store). Events exist principally to keep the user interface up-to-date with changes in the store. Code to maintain data integrity should be implemented in the working store using standard database mechanisms such as triggers and referential actions. Events raise after the transaction they occur in completes. Even though multiple processes can modify a store, events are generally guaranteed to arrive in a serialized order. If events fired immediately then listeners would not be guaranteed to receive events in the serialized order even if all transactions succeeded.

Events can be subscribed to in a standard manner, for example:
    table.ElementAttributeChanged +=
        new    ElementAttributeChangedEventHandler(OnTableChange);

No event handler should modify the store. If an event handler attempts to modify the store than an InvalidOperationException exception should be raised.

A meta-attribute value change raises an ElementAttributeChanged event after the transaction completes. These events may be subscribed to on the store, substore or the element. The events have the signatures:

```
delegate void
    ElementAttributeChangedEventHandler(object        sender,
        ElementAttributeChangedEventArgs e)
ElementAttributeChangedEventHandler ElementAttributeChanged
ElementAttributeChangedEventHandler ElementAttributeChanged
ElementAttributeChangedEventHandler ξAttributeChanged
ElementAttributeChangedEventHandler ξλChanged
ElementAttributeChangedEventHandler λChanged
``` where the signatures are for a Store (changes to the attributes), Element (changes to attributes), a Substore (changes to attributes of meta-class ξ), a Substore (changes to meta-class ξ's meta-attribute λ) and an Element μ (changes to the meta-attribute λ) level event respectively.

Meta-classes should implement change events for meta-attributes (even if the meta-class has no direct meta-attributes). These events should be able to be subscribed to on the meta-class or the element. The implementation of these events is straightforward. An event should be exposed for the substore level event with an implementation such as:

```
event ElementAttributeChangedEventHandler ξAttributeChanged {
    add {
        Store.AddElementAttributeChangedEventHandler(ξ,
                value);
    } // add
    remove {
        Store.RemoveElementAttributeChangedEventHandler(ξ,
                value);
    } // remove
} // ξAttributeChanged
``` where ξ is the meta-class and value is an event handler of type ElementAttributeChangedEventHandler. The store itself should propagate the event. Meta-classes should implement change events for individual meta-attributes. These events should be able to be subscribed to on the substore or the element. The implementation of these events is straightforward. An event should be exposed for the substore level event with an implementation such as:

```
event ElementAttributeChangedEventHandler ξλChanged {
    add {
        Store.AddElementAttributeChangedEventHandler(ξ.ξMetaClass,
                ξ.λMetaAttribute,
                value);
    } // add
    remove {
        Store.RemoveElementAttributeChangedEventHandler(ξ.ξMetaClass,
                ξ.λMetaAttribute,
                value);
    } // remove
} // ξλAttributeChanged
``` where ξ.ξMetaClass is the property giving ξ's meta-class, ξ.λMetaAttribute is the property giving λ's meta-attribute and value is an event handler of type ElementAttributeChangedEventHandler. The store itself should propagate the event. An event should be exposed for the element level event with an implementation such as:

```
event ElementAttributeChangedEventHandler ξChanged {
    add {
        Store.AddElementAttributeChangedEventHandler(ξMetaAttribute,
                value);
```
```
    } // add
    remove {
        Store.RemoveElementAttributeChangedEventHandler(ξMetaAttribute,
                value);
    } // remove
} // ξAttributeChanged
``` where ξMetaAttribute is the property giving ξ's meta-attribute and value is an event handler of type ElementAttributeChangedEventHandler. The store itself should propagate the event.

A class ElementAttributeChangedEventArgs inherits from EventArgs and supports public get properties MetaAttribute, MetaClass, Element, OldValue and NewValue with the signatures:

| | |
|---|---|
| MetaAttributeInfo | MetaAttribute |
| MetaClassInfo | MetaClass |
| Element | Element |
| object | OldValue |
| object | NewValue |

MetaAttribute is the meta-attribute that changed. MetaClass is the meta-class of the element that changed. Element is the element that changed. OldValue is the value of the attribute before the change. NewValue is the value of the attribute after the change.

The class ElementAttributeChangedEventArgs supports an internal constructor with the signature:

```
ElementAttributeChangedEventArgs (MetaAttributeInfo metaAttribute,
        MetaClassInfo    metaClass,
        Element      element,
        object       oldValue,
        object       newValue)
```

MetaAttribute is the meta-attribute that changed, metaClass is the meta-class of the element that changed, element is the element that changed, oldValue is the value of the attribute before the change and newValue is the value of the attribute after the change.

An element addition can raise an ElementAdded event after the transaction completes. These events may be subscribed to on the store or the substore. The events have the signatures:

```
delegate void ElementAddedEventHandler(object        sender,
        ElementAddedEventArgs e)
ElementAddedEventHandler ElementAdded
ElementAddedEventHandler ξAdded
``` where the signatures are for a Store and a Substore (addition of meta-class ξ) level event respectively.

Substores should implement added events for meta-classes (even if the meta-class has no direct instances). These events should be able to be subscribed to on the substore. The implementation of these events is straightforward. An event should be exposed for the substore level event with an implementation such as:

```
event ElementAddedEventHandler ξAdded {
    add {
        Store.AddElementAddedEventHandler(ξ.ξMetaClass,
                value);
    } // add
    remove {
        Store.RemoveElementAddedEventHandler(ξ.ξMetaClass,
                value);
    } // remove
} // ξAdded
``` where ξ.ξMetaClass is the property giving ξ's meta-class and value is an event handler of type ElementAddedEventHandler. The store itself will propagate the event. Container meta-classes should also support element added events for children at the element and substore level. This would allow, for example, subscription to all the elements added to a UML package.

The class ElementAddedEventArgs inherits from EventArgs and supports the public get properties MetaClass and Element with the signatures:

| MetaClassInfo | MetaClass |
| Element | Element |

MetaClass is the meta-class of the element that was added. Element is the element that was added. The class ElementAddedEventArgs supports an internal constructor with the signature:

| ElementAddedEventArgs(MetaClassInfo metaClass, |
| Element element) |

MetaClass is the meta-class of the element that was added and element is the element that was added.

An element removal will raise an ElementRemoved event after the transaction completes. These events may be subscribed to on the store, the substore or the element. After an element is removed from a store its state may be invalid thus it is an error to call non-object methods and properties for any element in response to an ElementRemoved event. The exceptions are the ID, Store and IsRemoved properties, which may be called after the element has been removed. The event has the signature:

| delegate void ElementRemovedEventHandler(object     sender, |
| ElementRemovedEventArgs e) |
| ElementRemovedEventHandler ElementRemoved |
| ElementRemovedEventHandler ξRemoved |
| ElementRemovedEventHandler ElementRemoved | where the signatures are for a Store, a Substore (addition of meta-class ξ) and an Element level event respectively.

Substores should implement removed events for meta-classes (even if the meta-class has no direct instances). These events should be able to be subscribed to on the substore. The implementation of these events is straightforward. An event should be exposed for the meta-class level event with an implementation such as:

```
event ElementRemovedEventHandler ξRemoved {
    add {
        Store.AddElementRemovedEventHandler(ξ.ξMetaClass,
                value);
    } // add
    remove {
        Store.RemoveElementRemovedEventHandler(ξ.ξMetaClass,
                value);
    } // remove
} // ξRemoved
``` where ξ.ξMetaClass is the property giving ξ's meta-class and value is an event handler of type ElementRemovedEventHandler. The store itself will propagate the event. Container meta-classes should also support element removed events for children at the element and meta-class level. This would allow, for example, subscription to the elements removed from a UML package.

The class ElementRemovedEventArgs inherits from EventArgs and supports public get properties MetaClass and Element with the signatures:

| MetaClassInfo | MetaClass |
| Element | Element |

MetaClass is the meta-class of the element that was removed. Element is the element that was removed. The class ElementRemovedEventArgs supports an internal constructor with the signature:

| ElementRemovedEventArgs(MetaClassInfo metaClass, |
| Element    element) |

MetaClass is the meta-class of the element that was removed and element is the element that was removed.

A meta-role player change will raise an RolePlayerChanged event after the transaction completes. These events may be subscribed to on the store, substore or the element. The events have the signatures:

| delegate void |
|     RolePlayerChangedEventHandler(object        sender, |
|         RolePlayerChangedEventArgs e) |
| RolePlayerChangedEventHandler RolePlayerChanged |
| RolePlayerChangedEventHandler RolePlayerChanged |
| RolePlayerChangedEventHandler ξRolePlayerChanged |
| RolePlayerChangedEventHandler ξλChanged |
| RolePlayerChangedEventHandler λChanged | where the signatures are for a Store (changes to role players), ElementLink (changes to all role players), a Substore (changes to role players of meta-relationship ξ), a Substore (changes to meta-relationship ξ's meta-role λ's role player) and an ElementLink μ (changes to the meta-role λ's role player) level event respectively.

Meta-classes should implement change events for the meta-role (even if the meta-relationship has no direct meta-roles). These events should be able to be subscribed to on the meta-relationship or the element link. The implementation of these events is straightforward. An event should be exposed for the substore level event with an implementation such as:

```
event RolePlayerChangedChangedEventHandler ξRolePlayerChanged {
    add {
        Store.AddRolePlayerChangedEventHandler(ξ,
                value);
    } // add
    remove {
        Store.RemoveRolePlayerChangedEventHandler(ξ,
                value);
    } // remove
} // ξRolePlayerChanged
``` where ξ is the meta-role and value is an event handler of type RolePlayerChangedEventHandler. The store itself will propagate the event. Meta-classes should implement change events for individual meta-roles. These events should be able to be subscribed to on the substore or the element link. The implementation of these events is straightforward. An event should be exposed for the substore level event with an implementation such as:

```
event RolePlayerChangedEventHandler ξλChanged {
    add {
        Store.AddRolePlayerChangedEventHandler(ξ.ξMetaClass,
                ξ.λMetaAttribute,
                value);
    } // add
    remove {
        Store.RemoveRolePlayerChangedEventHandler(ξ.ξMetaClass,
                ξ.λMetaAttribute,
                value);
    } // remove
} // ξλRolePlayerChanged
``` where ξ.ξMetaClass is the property giving ξ's meta-class, ξ.λMetaRole is the property giving λ's meta-role and value is an event handler of type RolePlayerChangedEventHandler. The store itself will propagate the event. An event should be exposed for the element link level event with an implementation such as:

```
event RolePlayerChangedEventHandler ξChanged {
    add {
        Store.AddRolePlayerChangedEventHandler(ξMetaRole,
                value);
    } // add
    remove {
        Store.RemoveRolePlayerChangedEventHandler(ξMetaRole,
                value);
    } // remove
} // ξChanged
``` where ξMetaRole is the property giving ξ's meta-role and value is an event handler of type RolePlayerChangedEventHandler. The store itself will propagate the event.

A class RolePlayerChangedEventArgs inherits from Event Args and supports the public get properties MetaRole, MetaRelationship, ElementLink, OldRolePlayer and NewRolePlayer with the signatures:

| | |
|---|---|
| MetaRoleInfo | MetaRole |
| MetaRelationshipInfo | MetaRelationship |
| ElementLink | ElementLink |
| Element | OldRolePlayer |
| Element | NewRolePlayer |

MetaRole is the meta-role that changed. MetaRelationship is the meta-role of the element link that changed. ElementLink is the element link that changed. OldRolePlayer is the role player before the change. NewRolePlayer is the role player after the change.

The class RolePlayerChangedEventArgs supports an internal constructor with the signature:

| | |
|---|---|
| RolePlayerChangedEventArgs(MetaRoleInfo | metaRole |
| MetaRelationshipInfo metaRelationship | |
| ElementLink | elementLink |
| Element | oldRolePlayer |
| Element | newRolePlayer) |

MetaRole is the meta-role that changed, metaRelationship is the meta-relationship of the element link that changed, elementLink is the element link that changed, oldRolePlayer is the role player before the change and newRolePlayer is the role player after the change.

Figure 9:
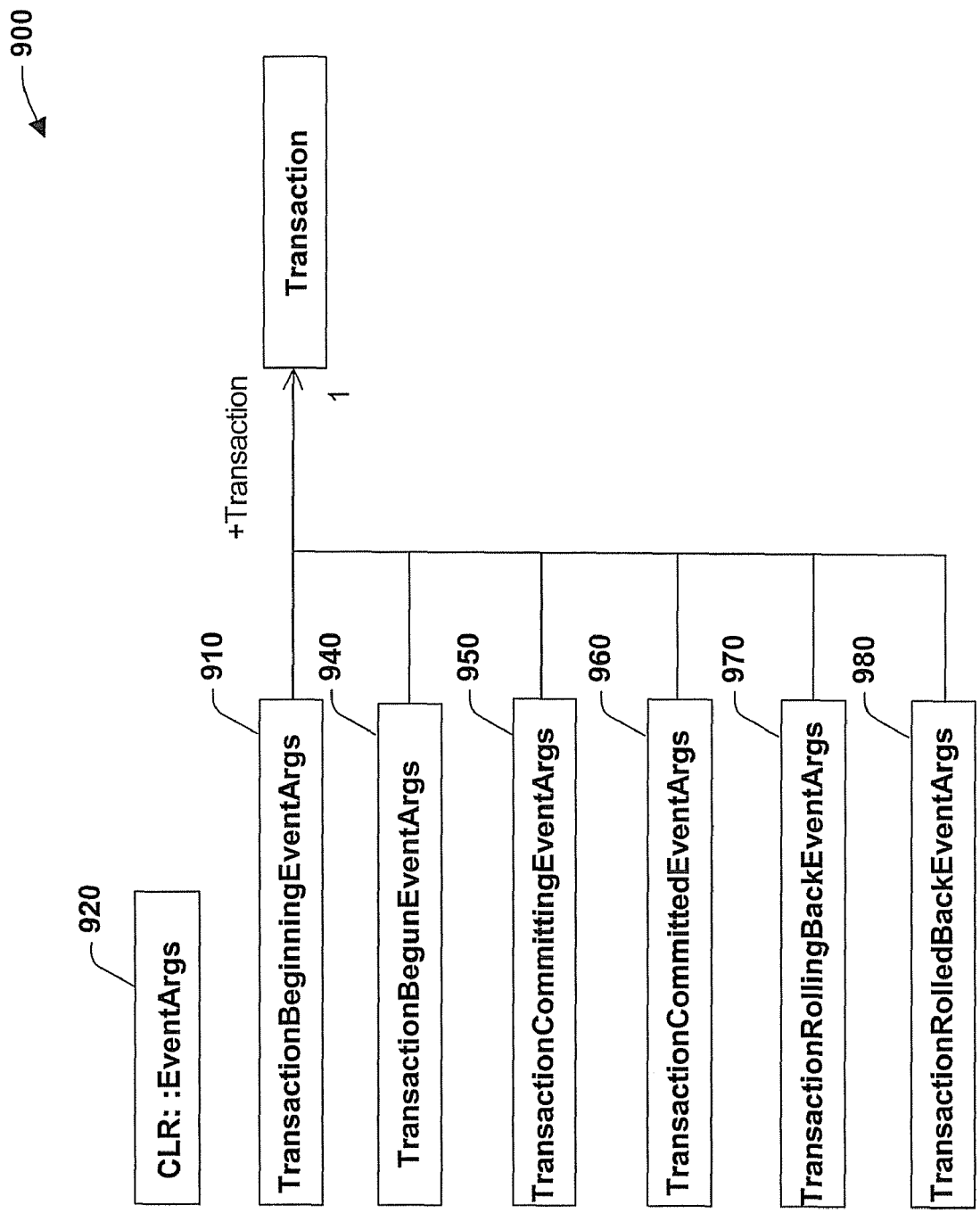
FIG. 9 is a diagram illustrating a transaction model in accordance with an aspect of the present invention.

FIG. 9 is a diagram illustrating a transaction model 900 in accordance with an aspect of the present invention. When beginning a transaction, a TransactionBeginning event can be raised. These events may be subscribed to on the store. The event has the signature:

```
delegate TransactionBeginningEventHander(
        object        sender,
        TransactionBegunEventArgs e)
TransactionBeginningEventHander TransactionBeginning
```

A class TransactionBeginningEventArgs 910 inherits from EventArgs 920 and supports the public get property Transaction with the signatures:
Transaction Transaction
Transaction 930 is the transaction that is beginning. Before a transaction 930 has begun, its state may be invalid thus it is an error to call non-object methods and properties for any transaction in response to a TransactionBeginning event. The exceptions are the ID and Store properties, which may be called before the transaction 930 has begun.

The class TransactionBeginningEventArgs 910 supports an internal constructor with the signature:
TransactionBeginningEventArgs(Transaction transaction) wherein transaction is the transaction that is beginning.
Beginning a transaction should raise a TransactionBegun event. These events may be subscribed to on the store. The event has the signature:

```
delegate TransactionBegunEventHander(object        sender,
        TransactionBegunEventArgs e)
TransactionBegunEventHander TransactionBegun
```

A class TransactionBegunEventArgs 940 inherits from EventArgs 920 and supports public get property Transaction with the signatures:
Transaction Transaction
The class TransactionBegunEventArgs 940 supports an internal constructor with the signature:
TransactionBegunEventArgs (Transaction transaction)
Committing a transaction should raise a TransactionCommitting event. These events may be subscribed to on the store. The event has the signature:

```
delegate TransactionCommittingEventHander(
    object      sender,
    TransactionCommittingEventArgs e)
TransactionCommittingEventHander TransactionCommitting
```

A class TransactionCommittingEventArgs 950 inherits from EventArgs 920 and supports public get property Transaction with the signatures:
Transaction Transaction
Transaction is the transaction that is committing.
The class TransactionCommittingEventArgs 950 supports an internal constructor with the signature:
TransactionCommittingEventArgs(Transaction transaction)
Committing a transaction should raise a TransactionCommitted event. These events may be subscribed to on the store. The event has the signature:

```
delegate TransactionCommittedEventHander(
    object      sender,
    TransactionCommittedEventArgs e)
TransactionCommittedEventHander TransactionCommitted
```

A class TransactionCommittedEventArgs 960 inherits from EventArgs 920 and supports the public get property Transaction with the signatures:
Transaction Transaction
Transaction is the transaction that has been committed. After a transaction is committed, its state may be invalid thus it is an error to call non-object methods and properties for any transaction in response to a TransactionCommitted event. The exceptions are the ID and Store properties, which may be called after the transaction has been committed.
The class TransactionCommittedEventArgs 960 supports an internal constructor with the signature:
TransactionCommittedEventArgs(Transaction transaction)
Rolling back a transaction should raise a TransactionRollingBack event. These events may be subscribed to on the store. The event has the signature:

```
delegate TransactionRollingBackEventHander(
    object      sender,
    TransactionRollingBackEventArgs e)
```

TransactionRollingBackEventHander TransactionRollingBack
A class TransactionRollingBackEventArgs 970 inherits from EventArgs 920 and supports public get property Transaction with the signatures:
Transaction Transaction
Transaction is the transaction that is being rolled back.
A class TransactionRollingBackEventArgs 970 supports an internal constructor with the signature:
TransactionRollingBackEventArgs(Transaction transaction)
Rolling back a transaction should raise a TransactionRolledBack event. These events may be subscribed to on the store. The event has the signature:

```
delegate TransactionRolledBackEventHander(
    object      sender,
    TransactionRolledBackEventArgs e)
TransactionRolledBackEventHander TransactionRolledBack
```

Figure 10:
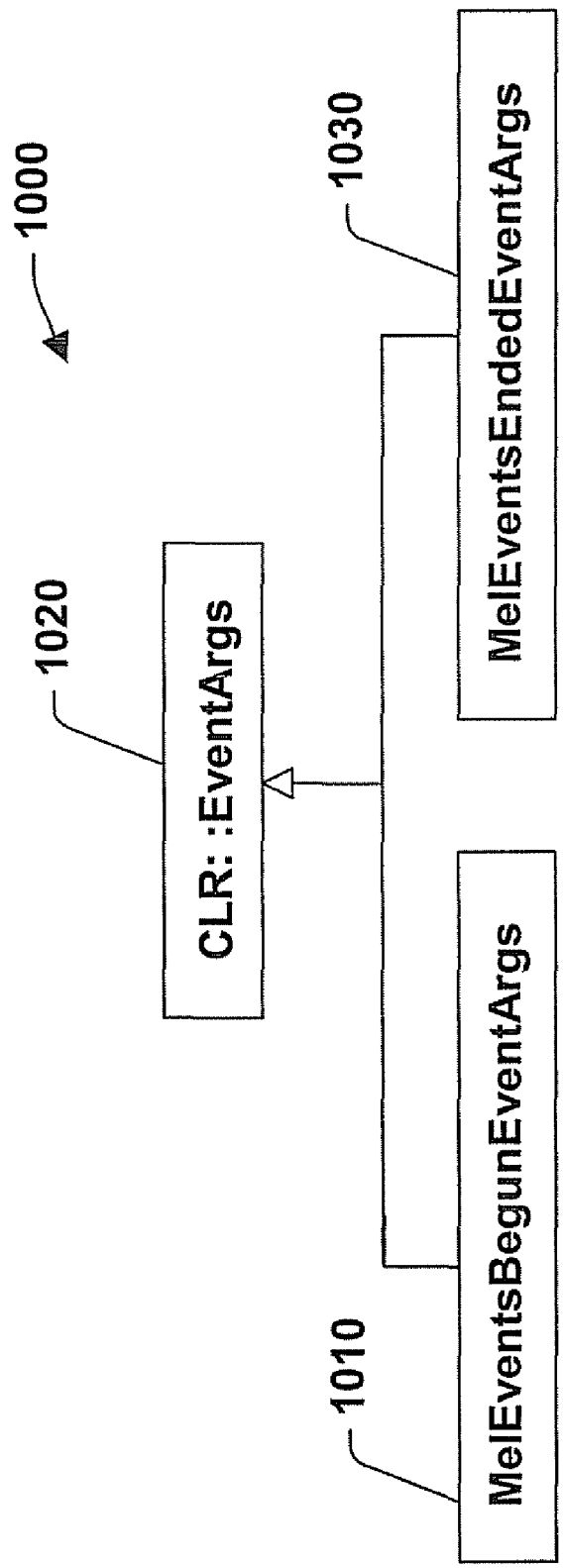
FIG. 10 is a diagram illustrating a model of element events in accordance with an aspect of the present invention.

A class TransactionRolledBackEventArgs 980 inherits from EventArgs 920 and supports the public get property Transaction with the signatures:
Transaction Transaction
Transaction is the transaction that has been rolled back. After a transaction is rolled back, its state may be invalid thus it is an error to call non-object methods and properties for any transaction in response to a TransactionRolledBack event. The exceptions are the ID and Store properties, which may be called after the transaction has been rolled back.
The class TransactionRolledBackEventArgs 980 supports an internal constructor with the signature:
TransactionRolledBackEventArgs(Transaction transaction)
FIG. 10 is a diagram illustrating a model of element events in accordance with an aspect of the present invention. Before firing a series of element events an ElementEventsBeginning event is raised. These events may be subscribed to on the store. The event has the signature:

```
delegate ElementEventsBegunEventHandler(object  sender,
    ElementEventsBegunEventArgs e)
    ElementEventsBegunEventHandler ElementEventsBegun
```

A class ElementEventsBegunEventArgs 1010 inherits from EventArgs 1020. After firing a series of element events an ElementEventsEnded event is raised. These events may be subscribed to on the store. The event has the signature:

```
delegate ElementEventsEndedEventHandler(object  sender,
                ElementEventsEndedEventArgs e)
    ElementEventsEndedEventHandler ElementEventsEnded
```

This event allows subscribers to element events to be more efficiently implemented since actions can be deferred until the events in a batch are processed. For example, a database table, on a diagram, with several changes could be redrawn only once instead of many times.
A class ElementEventsEndedEventArgs 1030 inherits from EventArgs 1020. The store supports the public methods AddElementAddedEvent,
RemoveElementAddedEvent, AddElementAttributeChangedEvent,
RemoveElementAttributeChangedEvent, AddElementRemovedEvent,
RemoveElementRemovedEvent, AddElementAttributeChangedEvent and
RemoveElementAttributeChangedEvent with the signatures:

```
delegate void
    ElementAttributeChangedEventHandler(
        object      sender,
        ElementAttributeChangedEventArgs e)
delegate void
```

-continued

```
      ElementAddedEventHandler(object      sender,
            ElementAddedEventArgs e)
delegate void
      ElementRemovedEventHandler(object      sender,
            ElementRemovedEventArgs e)
delegate void
      RolePlayerChangedEventHandler(object      sender,
            RolePlayerChangedEventArgs e)
event ElementAttributeChangedEventHandler ElementAttributeChanged
event ElementAddedEventHandler ElementAdded
event ElementRemovedEventHandler ElementRemoved
event RolePlayerChangedEventHandler RolePlayerChanged
AddElementAddedEventHandler(MetaClassInfo    metaClass,
            ElementAddedEventHandler handler)
RemoveElementAddedEventHandler(MetaClassInfo    metaClass,
            ElementAddedEventHandler handler)
AddElementAttributeChangedEventHandler(
      MetaClassInfo      metaClass,
            ElementAttributeChangedEventHandler handler)
AddElementAttributeChangedEventHandler(
      MetaClassInfo      metaClass,
      MetaAttributeInfo      metaAttribute,
            ElementAttributeChangedEventHandler handler)
RemoveElementAttributeChangedEventHandler(
      MetaClassInfo      metaClass,
            ElementAttributeChangedEventHandler handler)
RemoveElementAttributeChangedEventHandler(
      MetaClassInfo      metaClass,
      MetaAttributeInfo      metaAttribute,
            ElementAttributeChangedEventHandler handler)
AddElementRemovedEventHandler(MetaClassInfo    metaClass,
            ElementRemovedEventHandler handler)
AddElementRemovedEventHandler(Element      element,
            ElementRemovedEventHandler handler)
RemoveElementRemovedEventHandler(MetaClassInfo      metaClass,
            ElementRemovedEventHandler handler)
RemoveElementRemovedEventHandler(Element      element,
            ElementRemovedEventHandler handler)
AddRolePlayerChangedEventHandler(
      MetaRelationshipInfo      metaRelationship,
            RolePlayerChangedEventHandler handler)
AddRolePlayerChangedEventHandler(
      MetaRelationshipInfo      metaRelationship,
      MetaRoleInfo         metaAttribute,
            RolePlayerChangedEventHandler handler)
RemoveRolePlayerChangedEventHandler(
      MetaRelationshipInfo      metaRelationship,
            RolePlayerChangedEventHandler handler)
RemoveRolePlayerChangedEventHandler(
      MetaRelationshipInfo      metaRelationship,
      MetaRoleInfo      metaRole,
            RolePlayerChangedEventHandler handler)
```

AddElementAddedEventHandler registers handler to be called when an element of type metaClass is added to the store. RemoveElementAddedEventHandler unregisters handler to be called when an element of type metaClass is added to the store. AddElementAttributeChangedEventHandler registers handler to be called when an element of type metaClass has an attribute change value in the store. RemoveElementAttributeChangedEventHandler unregisters handler to be called when an element of type metaClass has an attribute change value in the store. AddElementAttributeChangedEventHandler registers handler to be called when an element of type metaClass has metaAttribute change value in the store. RemoveElementAttributeChangedEventHandler unregisters handler to be called when an element of type metaClass has metaAttribute change value in the store. AddElementRemovedEventHandler registers handler to be called when an element of type metaClass is removed from the store. RemoveElementRemovedEventHandler unregisters handler to be called when an element of type metaClass is removed from the store. AddRolePlayerChangedEventHandler registers handler to be called when an element link of type metaRelationship has a role player change in the store. RemoveRolePlayerChangedEventHandler unregisters handler to be called when an element link of type metaRelationship has a role player change value in the store. AddRolePlayerChangedEventHandler registers handler to be called when an element link of type metaRelationship has metaRole change value in the store. RemoveRolePlayerChangedEventHandler unregisters handler to be called when an element link of type metaRelationship has metaRole change value in the store.

The store supports public events ElementAdded, ElementAttributeChanged, ElementRemoved and RolePlayerChanged with the signatures:

| | |
|---|---|
| ElementAddedEventHandler | ElementAdded |
| ElementAttributeChangedEventHandler | ElementAttributeChanged |
| ElementRemovedEventHandler | ElementRemoved |
| RolePlayerChangedEventHandler | RolePlayerChanged |

ElementAdded raises when elements are added to the store. ElementAttributeChanged raises when an element, in the store, has an attribute changed. ElementRemoved raises when an element is removed from the store. RolePlayerChanged raises when an element link, in the store, has a role player changed.

Transactions are designed to allow a group of changes to a store to be made in an atomic and consistent way. Transactions may be nested. Completed transactions typically form a single undoable action. During a transaction the changes made so far can be rolled back (i.e., undone). Persistent changes to the document are made through transactions.

A transaction is created and used as in either the following example:

```
void ReverseEngineer( ) { ... }
...
   store.DoAsTransaction(ReverseEngineer, undoID);
or the example
   Transaction transaction = store.BeginTransaction(undoID);
   try {
      ...
      transaction.Commit( )
   }
   catch(System.Exception exception) {
      Debug.Assert(transaction.IsActive);
      if (transaction.IsActive)
         transaction.Rollback( );
   }
```

In the second example, the use of a try statement facilitates that the transaction is closed appropriately when the statement block completes—normally or with an exception. Threads using a particular instance of a store (and thus its SQL Server connection) participate in the current transaction (the last created transaction that is still open).

The store supports public methods DoAsTransaction and BeginTransaction with the signatures:

```
delegate void TransactedOperation( )
DoAsTransaction(TransactedOperation transactedOperation)
DoAsTransaction(TransactedOperation transactedOperation,
      string captionResource)
Transaction BeginTransaction( )
Transaction BeginTransaction(string captionResource)
void    UndoTransaction(Guid id)
void    RedoTransaction(Guid id)
void    DeleteTransactionRecordsBefore(Guid id)
```

DoAsTransaction takes a delegate and executes it in a new serializable transaction. If the new transaction is an outermost transaction then a description of the transaction is given by the second parameter (this description should be suitable for undo). If the delegate completes then the transaction is committed. If the delegate raises an exception then the transaction is rolled back and the exception re-raised. BeginTransaction creates a new transaction. If the transaction is an outermost transaction then a description of the transaction is given by the parameter (this description should be suitable for use in the undo user interface). The transaction will have an isolation level of serializable. UndoTransaction undoes the transaction with the ID id. RedoTransaction the transaction with the ID id. DeleteTransactionRecordsBefore discards transaction records before the transaction with the ID id.

The store supports the public get properties CurrentTransaction, InTransaction and TransactionDepth with the signatures:

| | |
|---|---|
| Transaction | CurrentTransaction |
| bool | InTransaction |
| int | TransactionDepth |

CurrentTransaction returns the innermost transaction or raises an InvalidOperationException exception if there is no active transaction. InTransaction returns whether or not there is an active transaction. TransactionDepth returns the current number of nested active transactions (0 if there are no active transactions).

A class Transaction supports public methods Rollback, and Commit with the following signatures:
  void Rollback( )
  void RollbackAll( )
  void Commit( )
  void CommitAll( )

Rollback rolls back the transaction. That is, undoes any changes so far and removes the transaction. RollbackAll rolls back the transaction and associated nested transactions. Commit commits the transaction. That is, keeps any changes made so far and removes the transaction. If the transaction is an outermost transaction then the changes will be durable. CommitAll commits the transaction and associated nested transactions.

Transaction commits and rollbacks can fail in certain unusual circumstances. If Rollback fails then a RollbackFailedException is raised. If Commit fails then a CommitFailedException is raised.

The class Transaction supports public get properties IsActive, IsOutermost, ID, Name, Caption and TransactionDepth with the signatures:

| | |
|---|---|
| bool | IsActive |
| bool | IsOutermost |
| Guid | ID |
| string | Name |
| string | Caption |
| Transaction | ParentTransaction |
| int | TransactionDepth |

IsActive returns whether or not the transaction is active (this property is intended for error checking). IsOutermost returns whether or not the transaction is the outermost transaction. ID returns the transaction's identifier. Name returns the corresponding SQL Server transaction's name. Caption returns the transaction's localized description (the empty string if there is no description). ParentTransaction returns the parent transaction (null if this is an outermost transaction). TransactionDepth returns the depth of the current transaction (1 if the transaction is an outermost transaction).

The class Transaction supports an internal constructor with the signature:

| |
|---|
| Transaction(Transaction parent, |
| string captionResource) |

Parent is the parent transaction (null if the new transaction is an outermost transaction) and captionResource is the resource ID of the transaction's localized description.

An example implementation of a substore (Core) containing a single meta-class (ModelElement) is included in Appendix A.

The material contained in Appendix A, which has been submitted withinin a compact disc as a file entitled "Appendix A.txt", created on May 3, 2011, and having 11 kilobytes of data is incorporated herein by reference in its entirety.

Figure 11:
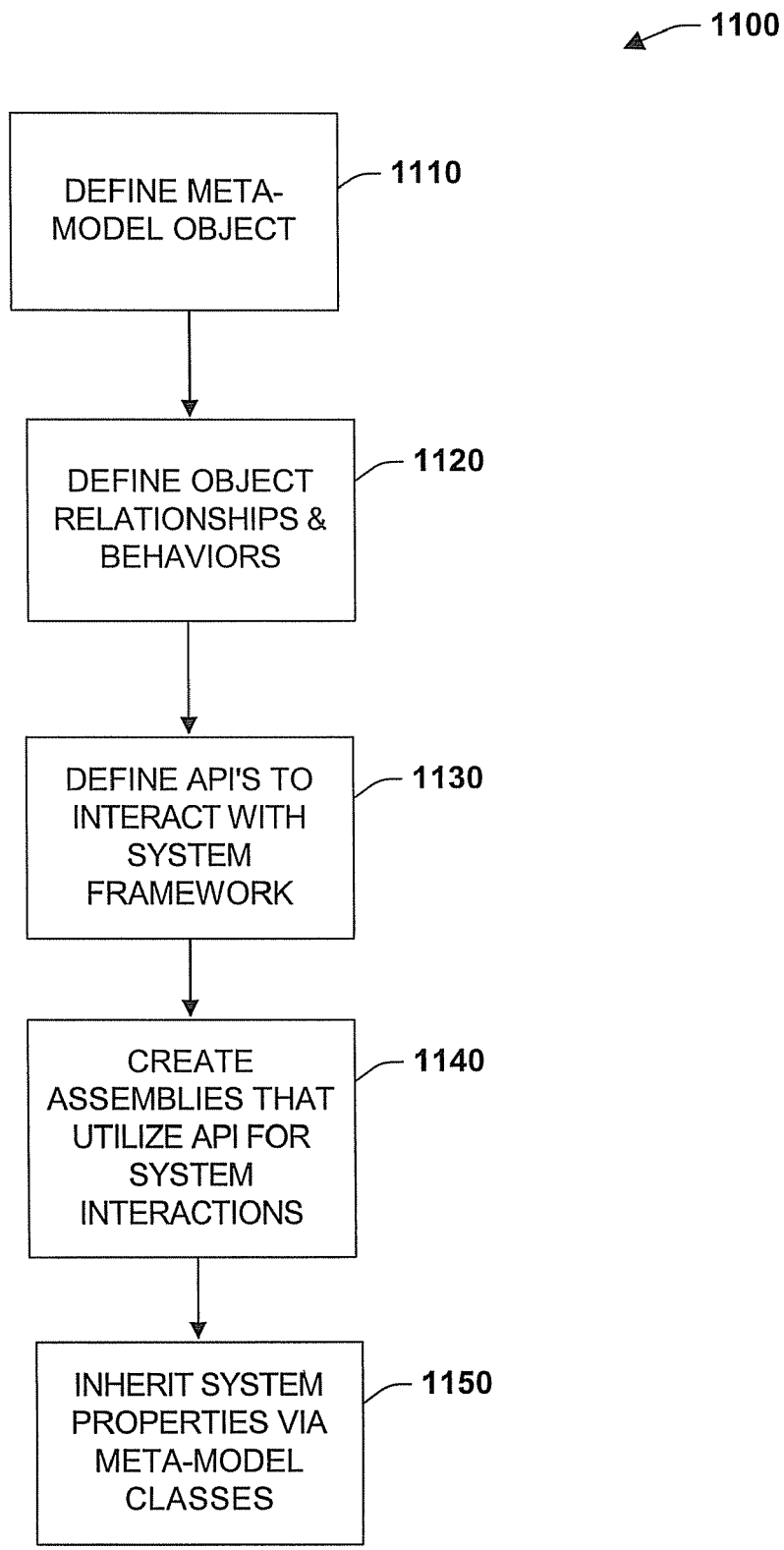
FIG. 11 is a flow diagram illustrating a meta-model process in accordance with an aspect of the present invention.

FIG. 11 illustrates a meta-model process in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 1110, one or more meta-model objects are defined. Such objects include aspects such as meta-classes, meta-relationships, meta-attributes, and other facilities described above for controlling, describing, and interacting with meta-data. At 1120, object relationships and behaviors are defined. As noted above, meta-classes for example, can have a relationship described in meta-data with other meta-classes thus provide a higher-level abstraction from ordinary object models. This also includes enabling meta-classes to inherit properties from other meta-classes which is also not provided by conventional object models. At 1130, one or more API's are provided to enable code to interact with an operating system framework. As noted above, the API's mitigate any given code from redundant and/or complex interactions with the system. At 1140, one or more assemblies are created that utilize the API's for system interactions. Such assemblies can be employed in conjunction with managed object systems, for example (e.g., .Net assemblies). At 1150, system properties are inherited via the meta-model classes described above. In this manner, system complexities such as writing complex code and managing system states, events, and/or transactions can be mitigated since these can be provided by the underlying framework and associated API.

Figure 12:
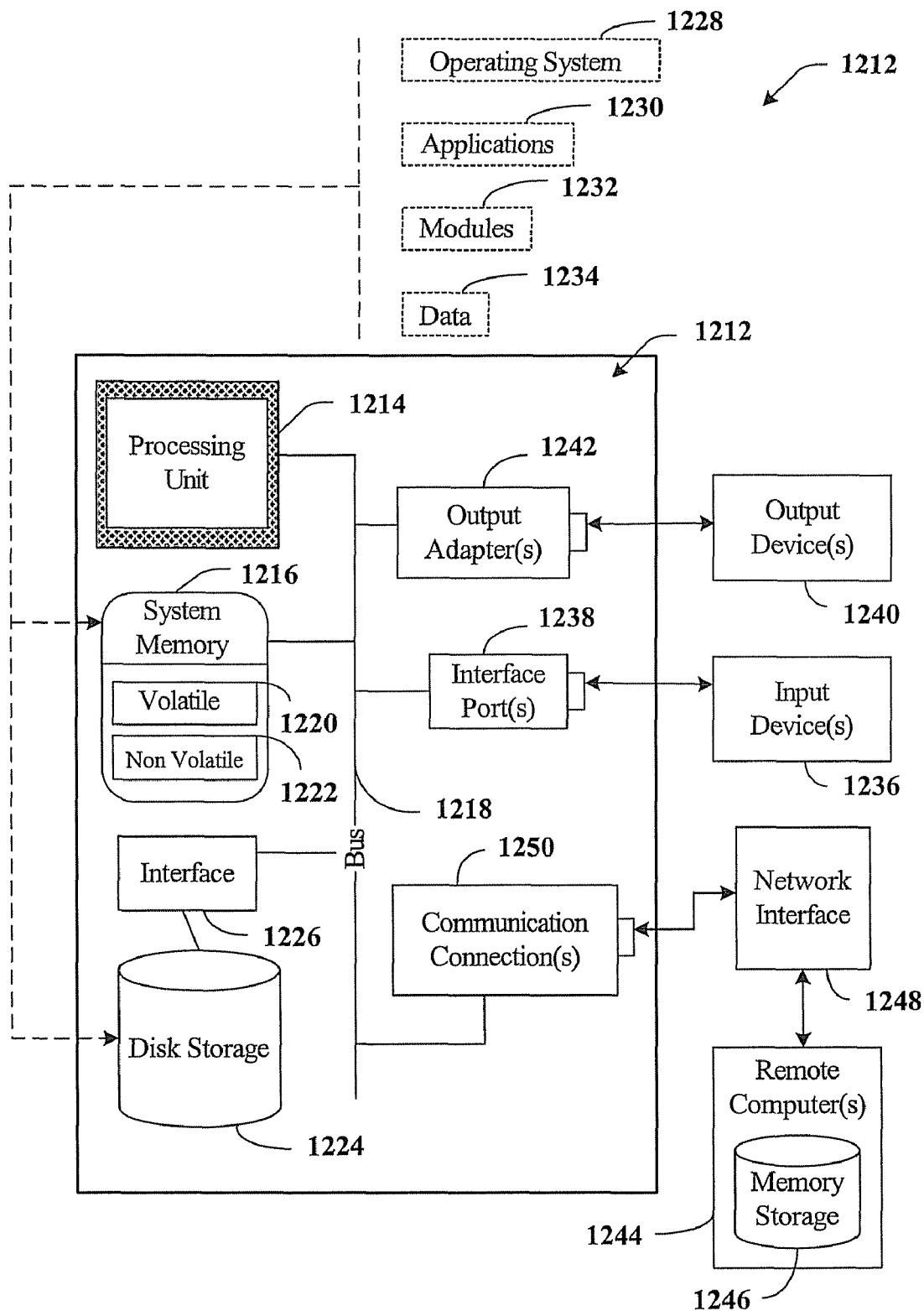
FIG. 12 is a schematic block diagram illustrating a suitable operating environment in accordance with an aspect of the present invention.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
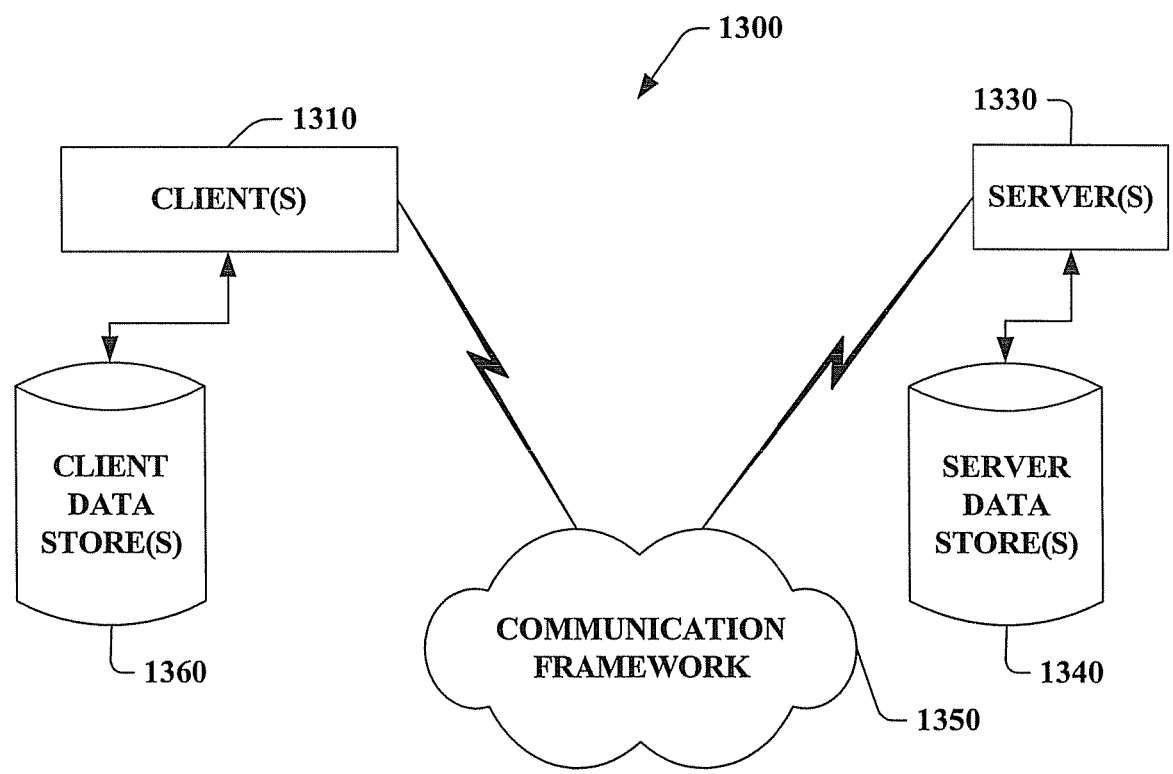
FIG. 13 is a schematic block diagram of a sample-computing environment with which the present invention can interact.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to model the structure of an item with meta-annotations, comprising:
    defining the structure of an item with a meta-model employing meta-data annotations, the meta-model at least including one meta-relationship and at least one meta-class, the at least one meta-relationship describing one or more relationships between meta-classes, the at least one meta-class being a class encapsulating data employed to represent another class, and the at least one meta-class is identified via a globally unique identifier; and
    reading the meta-data annotations from computer readable media to determine the structure of an item.

2. The method of claim 1, further comprising processing at least one of an event or a transaction when interacting with the meta-data annotations.

3. The method of claim 1, further comprising providing information derived from the meta-model to an application programming interface.

4. The method of claim 1, further comprising inheriting system properties through meta-model classes.

5. The method of claim 1, further comprising caching a portion of the meta-model from at least one of a client and a server system.

6. The method of claim 5, further comprising presenting a portion of the meta model to an application as if the portion resided on the client and server system.

7. The method of claim 2, further comprising employing a framework to leverage operating system services.

8. The method of claim 7, further comprising mitigating redundant code from operating system interactions.

9. The method of claim 1, further comprising creating assemblies utilizing at least one application programming interface for system interactions.

10. The method of claim 9, the assemblies are employed in conjunction with managed object systems.

* * * * *